(12) United States Patent
Jessen et al.

(10) Patent No.: US 11,949,532 B2
(45) Date of Patent: Apr. 2, 2024

(54) CAMERA-BASED COMMISSIONING

(71) Applicant: Lutron Technology Company LLC, Coopersburg, PA (US)

(72) Inventors: Johnathan Jessen, Hellertown, PA (US); Duheng Liang, Bethlehem, PA (US)

(73) Assignee: Lutron Technology Company LLC, Coopersburg, PA (US)

( * ) Notice: Subject to any disclaimer, the term of this patent is extended or adjusted under 35 U.S.C. 154(b) by 0 days.

(21) Appl. No.: 17/980,277

(22) Filed: Nov. 3, 2022

(65) Prior Publication Data
US 2023/0047010 A1    Feb. 16, 2023

Related U.S. Application Data

(63) Continuation of application No. 16/530,262, filed on Aug. 2, 2019, now Pat. No. 11,522,732.

(60) Provisional application No. 62/713,913, filed on Aug. 2, 2018.

(51) Int. Cl.
*G06T 7/70* (2017.01)
*G05D 1/00* (2006.01)
(Continued)

(52) U.S. Cl.
CPC ....... *H04L 12/2809* (2013.01); *G05D 1/0088* (2013.01); *G05D 1/0219* (2013.01);
(Continued)

(58) Field of Classification Search
CPC ........ H04L 12/2809; H04L 2012/2841; G05D 1/0088; G05D 1/0219; G05D 1/0253;
(Continued)

(56) References Cited

U.S. PATENT DOCUMENTS 11,522,732 B2 * 12/2022 Jessen ................. G05D 1/0253
2009/0316951 A1  12/2009 Soderstrom
(Continued)

FOREIGN PATENT DOCUMENTS

CN    102067164 A    5/2011
CN    104040596 A    9/2014
(Continued)

*Primary Examiner* — Minh D A
(74) *Attorney, Agent, or Firm* — Flaster Greenberg, P.C.

(57) ABSTRACT

Lighting control systems may be commissioned for programming and/or control with the aid of a mobile device. Design software may be used to create a floor plan of how the lighting control system may be designed. The design software may generate floor plan identifiers for each lighting fixture, or group of lighting fixtures. During commissioning of the lighting control system, the mobile device may be used to help identify the lighting devices that have been installed in the physical space. The mobile device may receive a communication from each lighting control device that indicates a unique identifier of the lighting control device. The unique identifier may be communicated by visible light communication (VLC) or RF communication. The unique identifier may be associated with the floor plan identifier for communication of digital messages to lighting fixtures installed in the locations indicated in the floor plan identifier.

54 Claims, 14 Drawing Sheets

(51) Int. Cl.
   *G06T 11/00* (2006.01)
   *H04L 12/28* (2006.01)
   *H05B 47/19* (2020.01)

(52) U.S. Cl.
   CPC ........... *G05D 1/0253* (2013.01); *G05D 1/027* (2013.01); *G05D 1/0274* (2013.01); *G06T 7/70* (2017.01); *G06T 11/00* (2013.01); *H05B 47/19* (2020.01); *G05D 2201/0211* (2013.01); *H04L 2012/2841* (2013.01)

(58) Field of Classification Search
   CPC ................ G05D 1/027; G05D 1/0274; G05D 2201/0211; G06T 7/70; G06T 11/00; H05B 47/19; H05B 47/105; H05B 47/195; Y02B 20/40
   See application file for complete search history.

(56) References Cited

U.S. PATENT DOCUMENTS

| | | |
|---|---|---|
| 2015/0002292 A1 | 1/2015 | Cavalcanti et al. |
| 2015/0147067 A1 | 5/2015 | Ryan et al. |
| 2015/0282282 A1 | 10/2015 | Breuer et al. |
| 2016/0037293 A1 | 2/2016 | Jovicic et al. |
| 2016/0191434 A1 | 6/2016 | Rice |
| 2016/0227634 A1 | 8/2016 | Engelen et al. |
| 2017/0013697 A1 | 1/2017 | Engelen et al. |
| 2017/0038787 A1 | 2/2017 | Baker et al. |
| 2017/0219681 A1 | 8/2017 | Ghinamo et al. |
| 2017/0219684 A1* | 8/2017 | Jovicic ................ H04W 64/006 |
| 2017/0245354 A1 | 8/2017 | Yadav et al. |
| 2018/0054876 A1 | 2/2018 | White et al. |
| 2018/0067593 A1 | 3/2018 | Tiwari et al. |
| 2018/0069932 A1 | 3/2018 | Tiwari et al. |
| 2018/0075168 A1* | 3/2018 | Tiwari ................ H04N 23/698 |
| 2018/0121571 A1 | 5/2018 | Tiwari et al. |
| 2018/0168020 A1 | 6/2018 | Casey et al. |
| 2018/0212793 A1 | 7/2018 | Burger et al. |

FOREIGN PATENT DOCUMENTS

| | | |
|---|---|---|
| CN | 107667552 A | 2/2018 |
| WO | 2015077767 A1 | 5/2015 |
| WO | 2017024268 A2 | 2/2017 |
| WO | 2017036747 A1 | 3/2017 |

* cited by examiner

CAMERA-BASED COMMISSIONING

CROSS-REFERENCE TO RELATED APPLICATIONS

This application is a continuation of U.S. Non-Provisional application Ser. No. 16/530,262, filed Aug. 2, 2019, which claims the benefit of U.S. Provisional Application Ser. No. 62/713,913, filed Aug. 2, 2018, the entirety of which is incorporated by reference herein.

BACKGROUND

Lighting control systems may include lighting fixtures that include lighting loads, such as electrical lighting control devices or light emitting diodes, for lighting a space. These lighting fixtures may include a lighting control device, such as a light-emitting diode (LED) driver or electrical ballast, for controlling electrical power to the lighting load. The lighting control system may also include a system controller, or hub, that is capable of sending instructions to the lighting control devices for controlling the electrical power provided to the lighting load. Typically, after the lighting control system is installed in a location, such as a residence, an office, or the like, the system controller may assign an address, such as a wireless address or a wired link address, to each lighting control device that it controls. The address may be used for sending instructions to the lighting control device.

However, at the time of commissioning of the lighting control system to enable proper control of the devices in the system, it is difficult to determine the lighting control devices at a specific location, such that the appropriate lighting control device can be programmed for lighting control. For example, a floor plan of the lighting control system may be designed and programmed on a computing device using design software. The floor plan may indicate each lighting fixture and its corresponding location in a room or building. The design software may create a database of programming and/or control information for controlling the lighting control devices at identified locations in the floor plan. The programming and/or control information may be uploaded to a system controller for controlling the lighting fixtures. However, the installer, at the location of a particular lighting fixture, cannot readily identify that particular lighting fixture or the lighting fixtures address to enable the programming and/or control information to be used to communicate the proper commands to the lighting fixtures at the defined locations on the floor plan. In some example systems, the lighting control devices may be installed in a location and a database may be created at the time of commissioning the system, but the identity and/or address of the devices at a given location may be unknown after installation for enabling proper programming for lighting control. Examples of design software for lighting control systems are described in greater detail in commonly-assigned U.S. Patent Application No. 2017/0228110, published Aug. 10, 2017; U.S. Patent Application No. 2017/0235470, published Aug. 17, 2017; and U.S Patent Application Publication No. 2018/0203591, all entitled CONFIGURING A LOAD CONTROL SYSTEM, the entire disclosures of which are hereby incorporated by reference.

Determining the identity and/or address that is assigned to a specific lighting control device or fixture may be time-consuming and/or expensive. For example, an installer may turn on individual lighting control devices (e.g., while others remain off) to associate the physical location of the lighting control devices (e.g., as determined by floor plan stored in the database created by the design software) with a given identifier or address of the lighting control device. In another example, radio frequency (RF) signal strength detection may be used to approximate which specific lighting control device or lighting fixture is closest to an installer. The installer may compare the lighting control device with the strongest signal strength to a floor plan and assign the serial number for a device closest to the installer's current location with a known identity in the floor plan.

SUMMARY

Lighting control systems may be commissioned for programming and/or control with the aid of a mobile device. As described herein, a lighting control system may include lighting control devices for providing an amount of power to a lighting load. A control device may send instructions to the lighting control device (e.g., via wired or wireless communication) for providing the amount of power to the lighting load. The lighting control device may be assigned a unique identifier (e.g., serial number, an address, such as a wireless address or a wired link address, etc.) for receiving instructions to provide the amount of power to the lighting load.

Design software may be implemented to identify the location of the lighting control devices within the lighting control system. The location may be, for example, a particular room in a building. For example, the design software may be used to create a floor plan of how the lighting control system may be designed, such as the location of lighting control devices within a space, the devices with which the lighting control devices interface, etc. The design software may also be used to program how the lighting control devices are to be programmed for performing lighting control. The floor plan may identify each lighting fixture and its corresponding location in a room or building. The design software may generate floor plan identifiers for each lighting fixture, or group of lighting fixtures. The design software may create a database that includes the programming and/or control information for controlling the lighting control devices that correspond to each lighting control device, or group of lighting control devices, identified by a floor plan identifier in the database.

During commissioning of the lighting control system, a mobile device may be used to help identify the lighting devices that have been installed in the physical space. For example, the mobile device may receive a communication from each lighting control device that indicates a unique identifier (e.g., serial number, address, etc.) of the lighting control device. The unique identifier may be communicated by visible light communication (VLC) (e.g., LiFi) or RF communication (e.g., Bluetooth signal or another RF communication signal).

The lighting control device in the lighting fixture may cause the lighting load to blink the unique identifier of the lighting control device such that it may be identified by images taken by the camera of the mobile device. For example, a mobile device may be oriented in relation to one or more of the lighting loads. The mobile device may generate a video recording or live video stream that captures a binary representation of the unique identifier of the lighting control device. The unique identifier may be blinked at a high frequency, such as a low bandwidth LiFi, for example.

The lighting control device in the lighting fixture may broadcast the unique identifier of the lighting control device via RF. The unique identifier may be broadcasted using a wireless technology and/or protocol, such as, for example, WI-FI®, BLUETOOTH®, near field communication (NFC), ZIGBEE®, THREAD, CLEAR CONNECT™, or the like. Multiple unique identifiers may be transmitted at the same time, e.g. by multiple lighting control devices. A mobile device may determine which unique identifier corresponds to which lighting control device by measuring the signal strength of the transmissions. For example, the mobile device may determine that the strongest received signal corresponds to the closest transmitting lighting control device, and/or that the weakest received signal corresponds to the farthest transmitting lighting control device.

A mobile device with a camera may aid in commissioning a lighting control system. A mobile device may be, for example, a cell phone, a laptop or tablet computer, or a wearable device (e.g., wearable computer glasses). The lighting control system may include one or more lighting fixtures and one or more lighting control devices. A lighting fixture may be, for example, a ceiling light. A lighting fixture (e.g., each lighting fixture) may be connected to a lighting control device. In an example, the camera may be pointed at one or more lighting fixtures, e.g. on the ceiling of a room. The mobile device may display an image of the lighting fixture on its screen. The lighting fixture may transmit a unique identifier, and the mobile device may receive the unique identifier from the lighting fixture. The unique identifier may be, for example, the serial number of the lighting control device that is controlling the fixture. For example, if a lighting control device with serial number "ABC123" is connected to a given fixture, that fixture may transmit the unique identifier "ABC123". A unique identifier may be transmitted by, for example, VLC (e.g., LiFi) signals. If the unique identifier is transmitted by VLC signals, it may be at a frequency that is high enough so as to be invisible to the human eye, e.g. 60 Hz. In addition, the unique identifier may be transmitted by, for example, RF signals.

In an example, once the mobile device has received the unique identifier transmitted by a lighting fixture, the mobile device may prompt the user of the mobile device to provide an identity of a floor plan lighting fixture that corresponds to the physical location of the transmitting lighting fixture. The mobile device may display a received unique identifier, and prompt a user to enter an alphanumeric string. For example, the device may display the unique identifier "ABC123," and the user may identify the fixture as "Downlight 3". The mobile device may display a floor plan in addition to the unique identifier and prompt the user to select a floor plan lighting fixture from the floor plan. For example, the device may display the unique identifier "ABC123" along with a floor plan, and the user may select the floor plan lighting fixture that corresponds with the transmitting lighting fixture. Once the user has provided an identity, the mobile device may associate the identity with the received unique identifier. The association may be stored in a table or otherwise retained. Associating a unique identifier with an identity may include storing information regarding the physical location of the load control device corresponding to the unique identifier. For example, an association may identify a load control device (e.g., a lighting control device) to which a user may send instructions using the associated unique identifier for controlling an amount of power provided to a lighting fixture.

Commissioning of a lighting control system may be performed, e.g. automatically or semi-automatically. A mobile device may determine its location, e.g. in a room within a building. In an example, a user of the mobile device may select a location, e.g. from a floor plan or a list of locations. In another example, the location may be automatically determined, e.g. by a real-time locating system executed on the mobile device. The location may be determined using, for example, global positioning system (GPS) data. If the location of the mobile device is located automatically, the location may be confirmed by the user.

Once the location of the mobile device is known, the mobile device may orient itself relative to one or more lighting fixtures within the location. For example, one or more of an internal compass, gyroscope, and/or accelerometer may be used to orient the mobile device. A mobile device may be oriented by receiving an image from a camera in the mobile device, and using one or more known objects and/or points within the location. For example, the device may use the position of one or more lighting fixtures and/or windows to determine its orientation. The device may determine its orientation by detecting the location of two or more corners of the room. The mobile device may receive input from the user regarding its orientation and may factor this input into its determination.

Once the location and orientation of the mobile device are known, the mobile device may capture an image of the location using a built-in camera. The image may include one or more lighting fixtures (e.g., one or more ceiling lights). A lighting fixture (e.g., each lighting fixture) may be connected to a lighting control device. Floor plan data may be overlaid onto the image. The floor plan data may graphically represent one or more floor plan lighting fixtures. A floor plan lighting fixture (e.g., each floor plan lighting fixture) may correlate to a lighting fixture, e.g. within the location of the mobile device. The floor plan data may include one or more icons representing the physical location of the lighting fixtures, representations of connections to other devices (e.g., other lighting fixtures, switches, sensors, or other devices), group identifiers indicating groups of lighting control devices that may be controlled together, and/or a combination thereof. The floor plan data may include one or more floor plan identifiers, e.g. one for each floor plan lighting fixture. The floor plan data may include programming and/or control information for controlling the lighting control devices at identified locations in the floor plan. The programming and/or control information may be uploaded to a system controller for controlling the lighting fixtures.

The lighting fixture may transmit a unique identifier, and the mobile device may receive the unique identifier from the lighting fixture. The unique identifier may be, for example, the serial number of the lighting control device that is controlling the fixture. For example, if a lighting control device with serial number "ABC123" is connected to a given fixture, that fixture may transmit the unique identifier "ABC123". Unique identifiers may be transmitted by, for example, VLC (e.g., LiFi) or RF. If the unique identifier is transmitted by VLC, it may be at a frequency that is high enough so as to be invisible to the human eye, e.g. 60 Hz.

Once the mobile device has received the unique identifier, the mobile device may associate the received unique identifier with the floor plan lighting fixture that correlates with the lighting fixture from which the unique identifier was received. The association may be stored in a table or otherwise retained. The association may be performed automatically, e.g. without the input of a user. The association may be performed semi-automatically, e.g. the user may confirm that the associations made are correct as a whole and/or individually. Associating a unique identifier with a floor plan lighting fixture may include storing information regarding the physical location of the load control device corresponding to the unique identifier. For example, an association may identify a load control device to which a user may send instructions using the associated unique identifier for controlling an amount of power provided to a lighting fixture.

DETAILED DESCRIPTION

Figure 1:
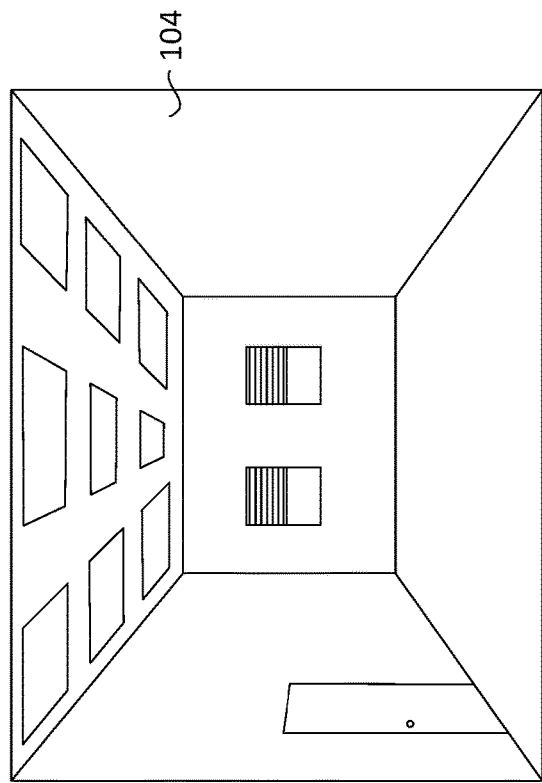
FIG. 1 is a perspective view of a representative environment for commissioning a lighting fixture.
Figure 1:
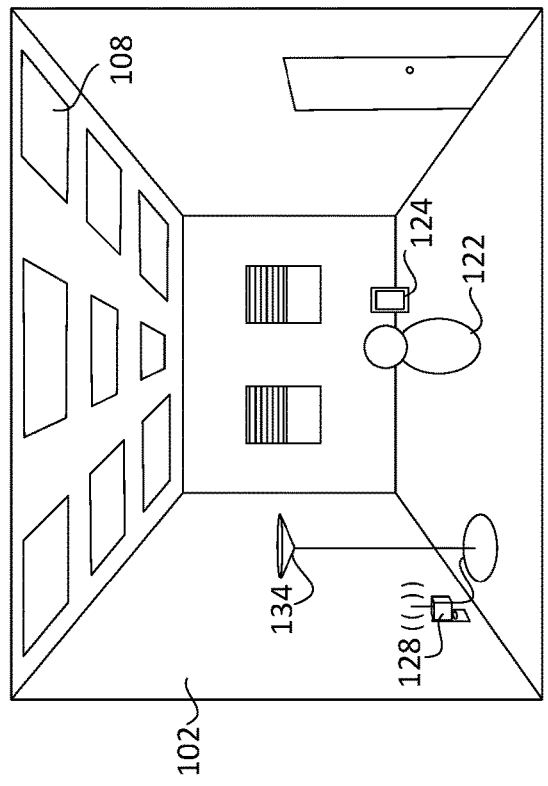
Figure 1:
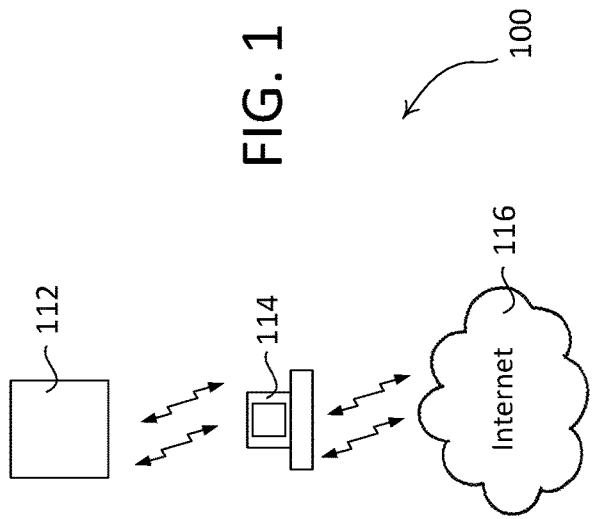
Figure 1:
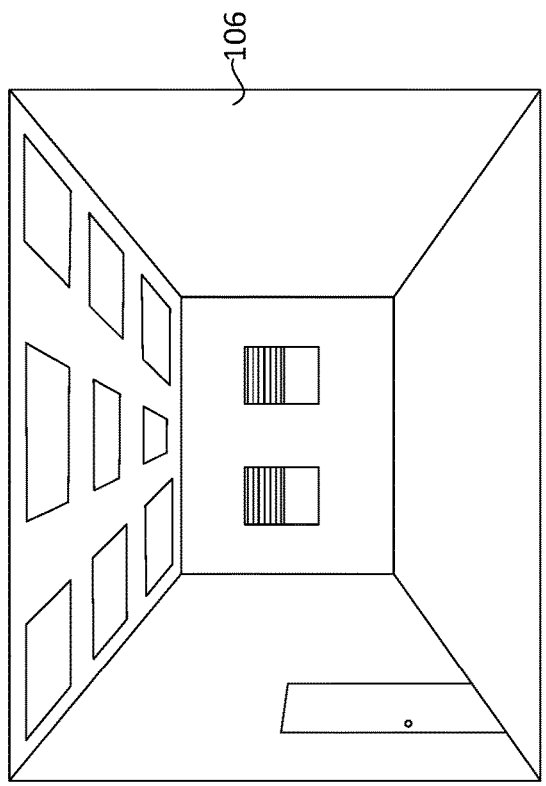

FIG. 1 is a perspective view of a representative environment for commissioning a load control system 100 having one or more lighting fixtures 108. As shown in FIG. 1, each of rooms 102, 104, and 106 may be in the same building and may be installed with one or more lighting fixtures. Rooms 102 and 104 may be on the same floor. Room 106 may be on a different floor than rooms 102 and 104. Each lighting fixture 108 may include one or more lighting loads (e.g., light-emitting diodes (LEDs), fluorescent lamps, etc.) and one or more lighting control devices (e.g., LED drivers, electronic ballasts, etc.) that are in communication with a control device (e.g., a system controller 112).

The communications between the system controller 112 and the lighting control devices of the lighting fixtures 108 may be wired or wireless communications. The Digital Addressable Lighting Interface (DALI) may be an example protocol used for wired communications between load control devices. Wireless communication protocols may include WI-FI®, BLUETOOTH®, near field communication (NFC), ZIGBEE®, THREAD, CLEAR CONNECT™, and/or other wireless communication protocols.

The system controller 112 may assign a unique identifier to each of the lighting control devices, or group of lighting control devices, with which it may be in communication for controlling the amount of power provided to the lighting loads of the corresponding lighting fixture. For example, a lighting control device may be assigned a unique identifier by the system controller 112 for communicating load control instructions for controlling the lighting load controlled by the lighting control device. The unique identifier may be stored at the lighting control device and may be used by the lighting control device to identify the instructions received from the system controller 112 to which to respond. Though description may be provided for commissioning lighting fixtures having a lighting control device or an LED driver, other lighting control devices may similarly be commissioned as described herein. For example, the lighting fixtures may each comprise a dimming circuit for controlling a dimmable lighting load, such as an incandescent lamp, or another lighting control device for controlling a different type of lighting load.

The unique identifiers may be randomly assigned to each lighting control device (e.g., after installation). The unique identifiers may not indicate the physical locations of the lighting control devices, and thus a user 122 may have difficulty controlling the lighting control devices based on their corresponding unique identifiers. Each lighting control device may also be assigned a floor plan identifier (e.g., during a design process of the load control system prior to installation of the lighting control devices) that may identify the physical location of each lighting control device to the user 122. For example, the floor plan identifier may be included on a floor plan of the physical space (e.g., building, room, etc.) or other means that may enable the user 122 to recognize the physical location of a lighting control device or group of lighting control devices. As the user 122 may know the floor plan identifier associated with each lighting control device, but may be unaware of the unique identifier for communicating instructions to the lighting control device, the user 122 may operate to associate each floor plan identifier with the unique identifier assigned to the lighting control device during commissioning of the lighting control system.

As shown in FIG. 1, the user 122 may know the floor plan identifier of a lighting control device and may want to associate the lighting control device with the unique identifier assigned to lighting control device by the system controller 112. To determine the unique identifier assigned to the lighting control device, the system controller 112 may instruct the lighting control devices in rooms 102, 104, and 106, or a subset thereof, to identify the unique identifier assigned thereto. For example, the system controller 112 may instruct the lighting control devices to reveal themselves by blinking a corresponding lighting load of a lighting fixture by modulating the magnitude of the light emitted by the lighting fixture (e.g., flashing at a very fast rate) in a manner that indicates the unique identifier. The blinking may be performed at a rate unidentifiable by the human eye, but identifiable by a camera (e.g., greater than approximately 100 Hz). The lighting control device may use the associated lighting load of the lighting fixture 108 to identify the unique identifier assigned to the lighting control device by blinking the lighting load of the lighting fixture 108 in a manner that identifies the unique identifier. The lighting control device may blink the lighting load of the lighting fixture 108 by increasing and decreasing an amount of power provided to the lighting fixture 108, such that the unique identifier is exposed by blinking the lighting load of the lighting fixture 108. For example, the lighting control device may turn the lighting load of the lighting fixture 108 on and off, increasing and decreasing the dimming level of the lighting load, or some combination thereof.

The lighting control devices may also, or alternatively, reveal themselves by communicating a digital message that includes the unique identifier assigned to the lighting control device. For example, the unique identifier may be communicated via a radio frequency (RF) communication, such as WI-FI®, BLUETOOTH®, near field communication (NFC), ZIGBEE®, CLEAR CONNECT™, etc., from the lighting control device of the lighting fixtures.

The mobile device 124 may identify the unique identifier provided by the lighting control device (e.g., by visually identifying the unique identifier in images captured by a camera of the mobile device 124) and the unique identifier may be associated with the floor plan identifier assigned to the lighting control device. The association may be performed via the mobile device 124 (e.g., a user device, a cellular phone, a tablet, a wireless load control device, a photosensor, etc.), the system controller 112, and/or a server 114 (e.g., a remote computer). If the association is performed at the mobile device 124, the association may be sent to the server 114 and/or the system controller 112 for storage.

The system controller 112 may send the identification instructions to the lighting control device upon receiving a trigger from the user 122. For example, the user 122 may select a button on the mobile device 124 that causes the mobile device 124 to send a message to system controller 112 to trigger transmission of the identification instructions. The mobile device 124 may communicate with the system controller 112 directly via a short range wireless channel (e.g., WI-FI®, BLUETOOTH®, etc.) and/or indirectly via the server 114 and the internet 116 (e.g., using a WI-FI® network, a cellular network, a WI-MAX® network, etc.). The server 114 may forward communications received from the mobile device 124 to the system controller 112 using a wired or wireless communication.

In another example, the identification instructions may be sent to each lighting control device directly from the mobile device 124. For example, the mobile device 124 may send the identification instructions via a broadcast message that may cause any lighting control device that receives the instructions to identify its unique identifier. The broadcast message may be sent via any short range wireless channel (e.g., WI-FI®, BLUETOOTH®, etc.), for example.

As the lighting control device in the lighting fixture 108 may be included in a group of lighting control devices blinking their respective unique identifier, the mobile device 124 may be able to capture images (e.g., multiple sequential images, such moving images or videos) that include the unique identifier of multiple lighting control devices without having to change locations. For example, the camera on the mobile device 124 may be able to capture images of each of the lighting fixtures being blinked by the respective lighting control devices in the group to visually identify the unique identifier of each lighting control device in the group. The camera on the mobile device 124 may be able to capture images of each of the blinking lighting fixtures from one location or may move from the physical location of one lighting control device to the next to capture images of the unique identifier of each lighting control device. While FIG. 1 illustrates identification of a unique identifier for a lighting control device (e.g., an LED driver), the unique identifier may be similarly identified for other lighting control devices capable of controlling a lighting load, such as an LED driver, a ballast, or other lighting control device, for example.

Figure 2:
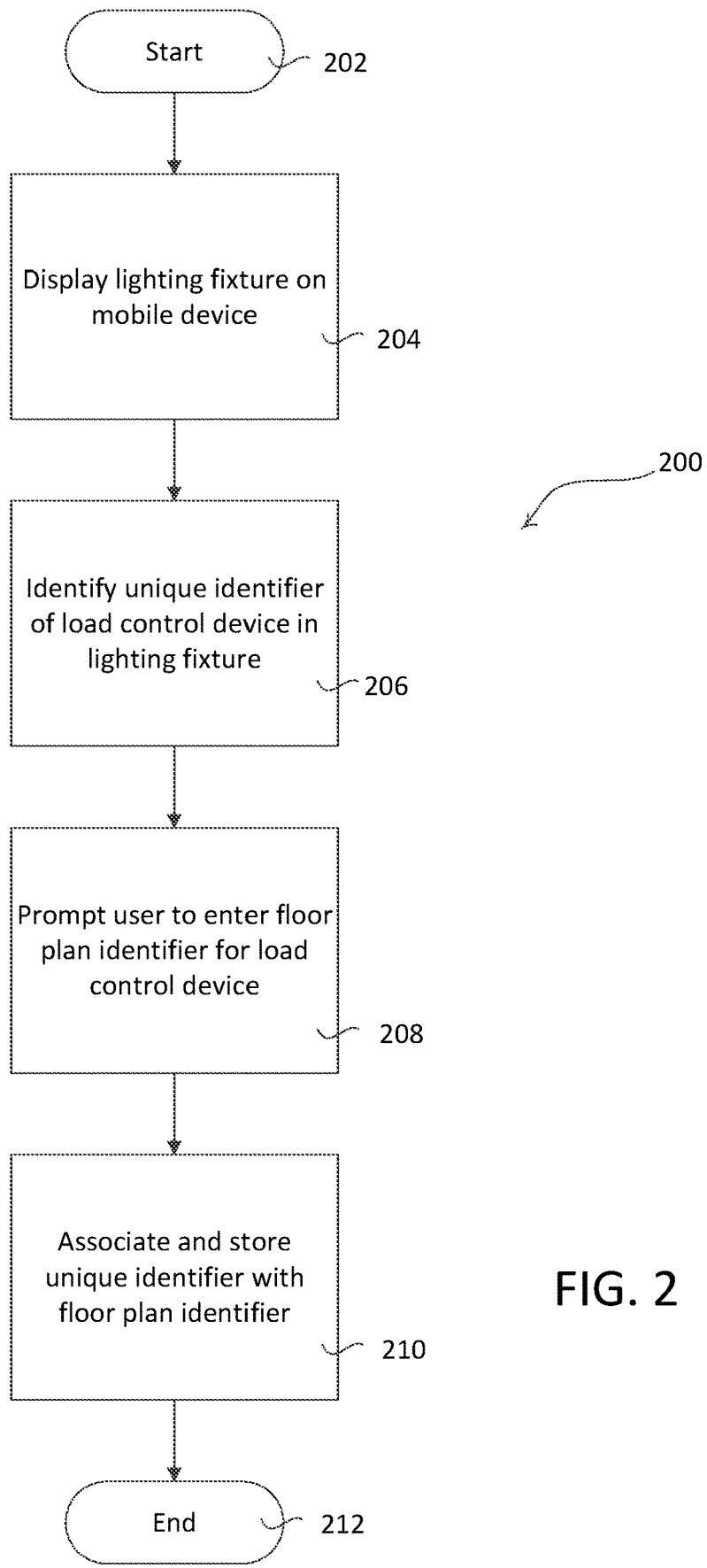
FIG. 2 is a flow diagram depicting an example method for identifying a lighting fixture and associating it with a load control device.

FIG. 2 is a flow diagram depicting an example method 200 for identifying a lighting fixture (e.g., a lighting control device that controls a lighting load of the lighting fixture) and associating a unique identifier with a floor plan identifier of the lighting fixture, e.g., using a mobile device. The method 200 may start at 202. At 204, the mobile device may capture an image of a lighting fixture and display an image of the lighting fixture on a display of the mobile device. The mobile device may be located in a given location. For example, the location may be a hallway or a room of a building. The image of the lighting fixture may be a single image or a video of the location on the display of the mobile device. The display may show one or more lighting fixtures. The mobile device may highlight or otherwise denote the lighting fixtures so that they are identifiable by the user. The mobile device may prompt the user to select a lighting fixture to commission. Alternatively, the mobile device may select a lighting fixture automatically.

At 206, a unique identifier of the load control device in the lighting fixture may be identified. The unique identifier may be identified by the mobile device, the system controller, or another device. The unique identifier may identify a lighting control device that controls the lighting fixture. The unique identifier may be an alphanumeric string. The lighting control device may transmit the unique identifier by, for example, causing a lighting load of the lighting fixture to blink in a predetermined pattern (e.g., to modulate the light emitted by the lighting fixture to transmit the unique identifier via VLC signals) or otherwise blink to communicate data. The unique identifier may be communicated at a frequency that is imperceivable to the human eye (e.g., greater than approximately 100 Hz). The camera on the mobile device may capture the images that include the signaling of the unique identifier, which may be interpreted by the mobile device, the system controller, or another device. The unique identifier may also, or alternatively, be communicated via RF. For example, the unique identifier may be signaled using WI-FI®, BLUETOOTH®, near field communication (NFC), ZIGBEE®, CLEAR CONNECT®, and/or another RF protocol. If there is more than one lighting fixture, the mobile device may determine which lighting fixture communicated the unique identifier by comparing signal strengths. For example, the mobile device may determine that the unique identifier associated with the strongest RF signal was received from the lighting control device that is physically closest to the mobile device. The mobile device may prompt the user to confirm that its determination is correct. Alternatively, the user may indicate which lighting fixture communicated the unique identifier. The user may select a button on the mobile device to cause the mobile device to send a digital message to a lighting control device to blink its respective lighting load, so that the user can view the blinking lighting load of the lighting control device in the physical space that corresponds with a given RF signal strength or unique identifier.

At 208, the mobile device may prompt the user to enter a floor plan identifier for the lighting fixture from which the unique identifier was received. The mobile device may display a popup window showing the received unique identifier. The popup window may contain a text box in which the user may enter the floor plan identifier. The floor plan identifier may be an alphanumeric string. For example, a floor plan identifier for a given lighting fixture may be "Downlight 1". The mobile device may suggest a floor plan identifier to the user based on, for example, floor plan data that is accessible to the mobile device. The floor plan data may be generated during a design process of the load control system prior to installation of the load control system. Each lighting fixture within a given location may have a unique floor plan identifier in the floor plan data. The mobile device may prompt the user to confirm that the entered floor plan identifier is correct.

At 210, the entered floor plan identifier may be associated with the received unique identifier. The association may be performed by the mobile device, the system controller, or another device. The association between the floor plan identifier and the unique identifier may be stored in a memory of the mobile device and may be transmitted by the mobile device to an external device having a memory (e.g., the system controller, a server, and/or another external device) and stored on the external device. For example, the system controller and/or the server may be configured to identify commands for the lighting control devices using the floor plan identifiers, and transmit the commands to the lighting control devices using the unique addresses of the lighting control devices. In addition, the association may be transmitted to the lighting control devices and stored on a memory of the lighting control devices, such that the lighting control devices can identify messages that include their floor plan identifier. The method 200 may end at 212 and the associations may be used to configure and/or control the lighting loads in the lighting control system.

Figure 3:
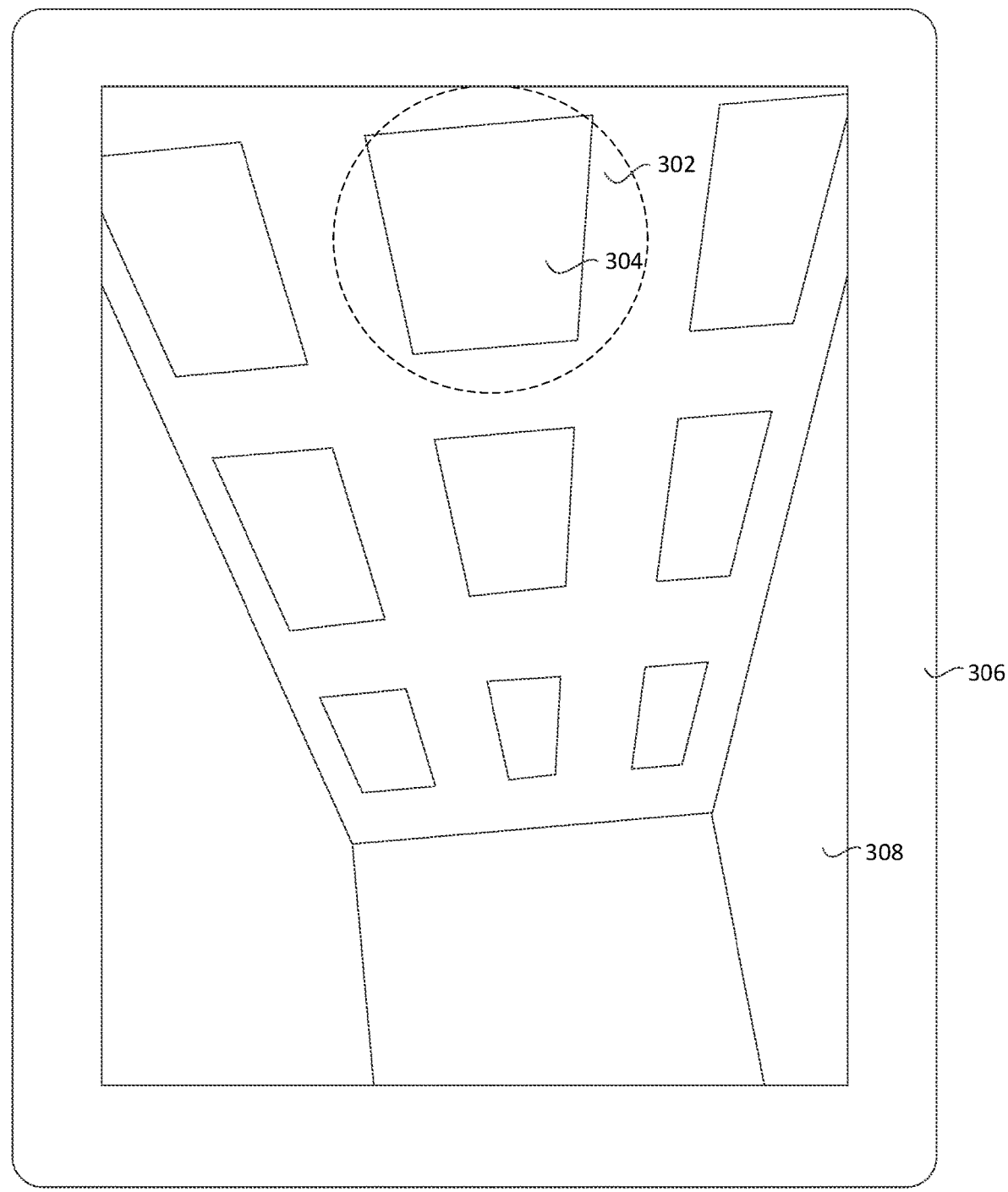
FIG. 3 depicts a representative image that may be displayed on a mobile device to identify a lighting fixture.

FIG. 3 depicts an example image 308 that may be obtained by a mobile device 306 for displaying one or more lighting fixtures (e.g., at 204 of the method 200 of FIG. 2). The image 308 may represent a frame of a video generated by the mobile device 306, for example. The image 308 may include the lighting fixtures within a room, or a subset thereof.

The mobile device 306 may detect a lighting fixture 304 automatically or based on user indication. The mobile device 306 may use an internal camera to capture an image or video of the lighting fixture 304. The user may orient the mobile device 306 such that the internal camera is pointed towards one or more lighting fixtures. The image 308 may be displayed on a display of the mobile device 306.

The mobile device 306 may detect the lighting fixture 304 automatically by comparing portions of the image 308 to determine whether one or more portions of the image 308 exceed an intensity threshold. For example, the mobile device 306 may determine that the portion of the image 308 within the area 302 exceeds the intensity threshold and may determine that the area 302 includes the lighting fixture 304. The intensity threshold may be relative to the intensity level of the other portions of the image 308 to compensate for the lighting level of different videos, images, mobile device displays, or the like. The mobile device 306 may detect lighting fixtures within the area 302 by detecting the shapes of one or more lighting fixtures within the image 308. The mobile device 306 may be preconfigured to identify the size and/or shape of standard lighting fixtures in a building. The lighting fixtures may be compared to other portions of the room to determine the relative size of the lighting fixtures. For example, the lighting fixtures may be compared to ceiling tiles, windows, or other objects within the image to determine the relative size of the lighting fixtures. The largest lighting fixture, or group of lighting fixtures, may be automatically detected by the mobile device 306 for association.

In another example, a user may indicate that the lighting load area 302 includes the lighting fixture 304. The user may provide such an indication by selecting within the area 302, circling the area 302, or otherwise indicating the area 302. The mobile device 306 may assume there is a fixture within a predefined area indicated by a user, or may automatically detect one or more lighting fixtures within the identified portion of the image, as described herein.

Figure 4:
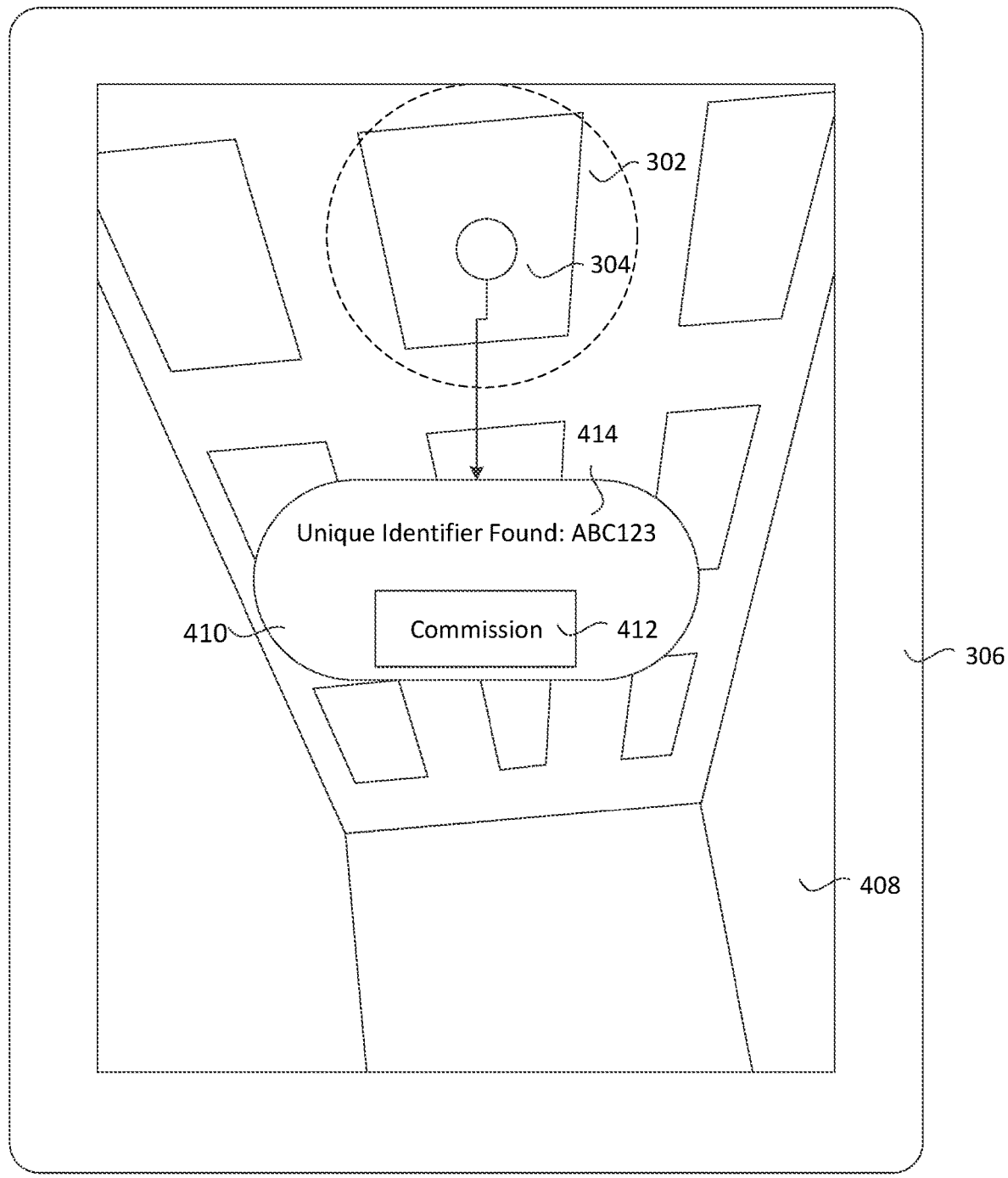
FIG. 4 depicts another representative image that may be displayed on a mobile device to identify a lighting fixture.

After the lighting load area 302 is identified, the mobile device 306 may analyze incoming video or frames of the video to detect the unique identifier indicated by the lighting load of the lighting fixture 304. FIG. 4 depicts an example image 408 that may be generated by a mobile device 306 for commissioning a lighting control device to display and/or identify a unique identifier 414 for the lighting control device (e.g., at 206 of the method 200 of FIG. 2). The image 408 may represent a frame of a video generated by the mobile device 306, for example. The image 408 may include the lighting fixtures within a location (e.g., a room of a building), or a subset thereof. The mobile device 306 may overlay floorplan data, such as a unique identifier 414 that the mobile device 306 has received from a lighting control device (not shown), onto the image 408. The unique identifier 414 may be signaled by the lighting load of the lighting fixture 304. The unique identifier 414 may be displayed in a popup window 410. The mobile device 306 may indicate the lighting fixture 304 associated with the unique identifier 414 via overlay. If there is more than one lighting control device in the location, the mobile device 306 may indicate to the user which lighting control device sent the unique identifier 414. For example, the mobile device 306 may indicate to the user that the unique identifier 414 was received from a lighting control device controlling the lighting load of lighting fixture 304. The popup window 410 may include a commission button 412 that, when pressed, may allow the user to enter floor plan data, such as a floor plan identifier, for the lighting fixture 304. The mobile device 306 may prompt the user to confirm that the entered floor plan data is correct.

Referring again to FIG. 3, a lighting control device (not shown) may control the lighting load of the lighting fixture 304 and may use the lighting load of the lighting fixture 304 to signal the unique identifier of the lighting control device. For example, the mobile device 306 may receive the signal from the lighting load of the lighting fixture 304 and may identify the unique identifier being signaled. The unique identifier may be transmitted and received via VLC signals. For example, the unique identifier of the lighting control device may be signaled by blinking the lighting load of the lighting fixture 304 in a pattern, sequence, rate, or the like that corresponds to the unique identifier.

The lighting control device may signal its unique identifier via, for example, RF signals. The mobile device 306 may receive an RF signal from the lighting control device and determine the unique identifier based on the received signal (e.g., included in the RF signal). The RF signal may be a short-range signal (e.g., a WI-FI® signal, a BLUETOOTH® signal, a near field communication (NFC) signal, a ZIG-BEE® signal, a CLEAR CONNECT™ signal, or the like), or another RF signal. The mobile device 306 may receive unique identifiers from more than one lighting control device at the same time. The mobile device 306 may use the received signal strength to determine which unique identifier was sent by which lighting control device. For example, the mobile device 306 may determine that the unique identifier associated with the strongest RF signal was received from the lighting control device that is physically closest to the mobile device 306. The mobile device 306 may use information from the image 308 to determine which lighting control device is physically closest to the mobile device 306. For example, the mobile device 306 may identify the lighting control device in the lighting fixture 304 as being physically closest to the mobile device based on its relative size to other lighting fixtures. The physically closest lighting control device may be located in a single lighting fixture that is included in the image, when one lighting fixture is identified. The mobile device 306 may use input from the user to determine which lighting control device is closest to the mobile device 306. For example, the mobile device 306 may prompt the user to select the lighting control device that is closest to the mobile device 306. The user may select the lighting fixture 304 as being the lighting device that is physically closest. The lighting device that is identified as being physically the closest may be assumed by the mobile device 306 as having the unique identifier that is received with the strongest RF signal.

Figure 5:
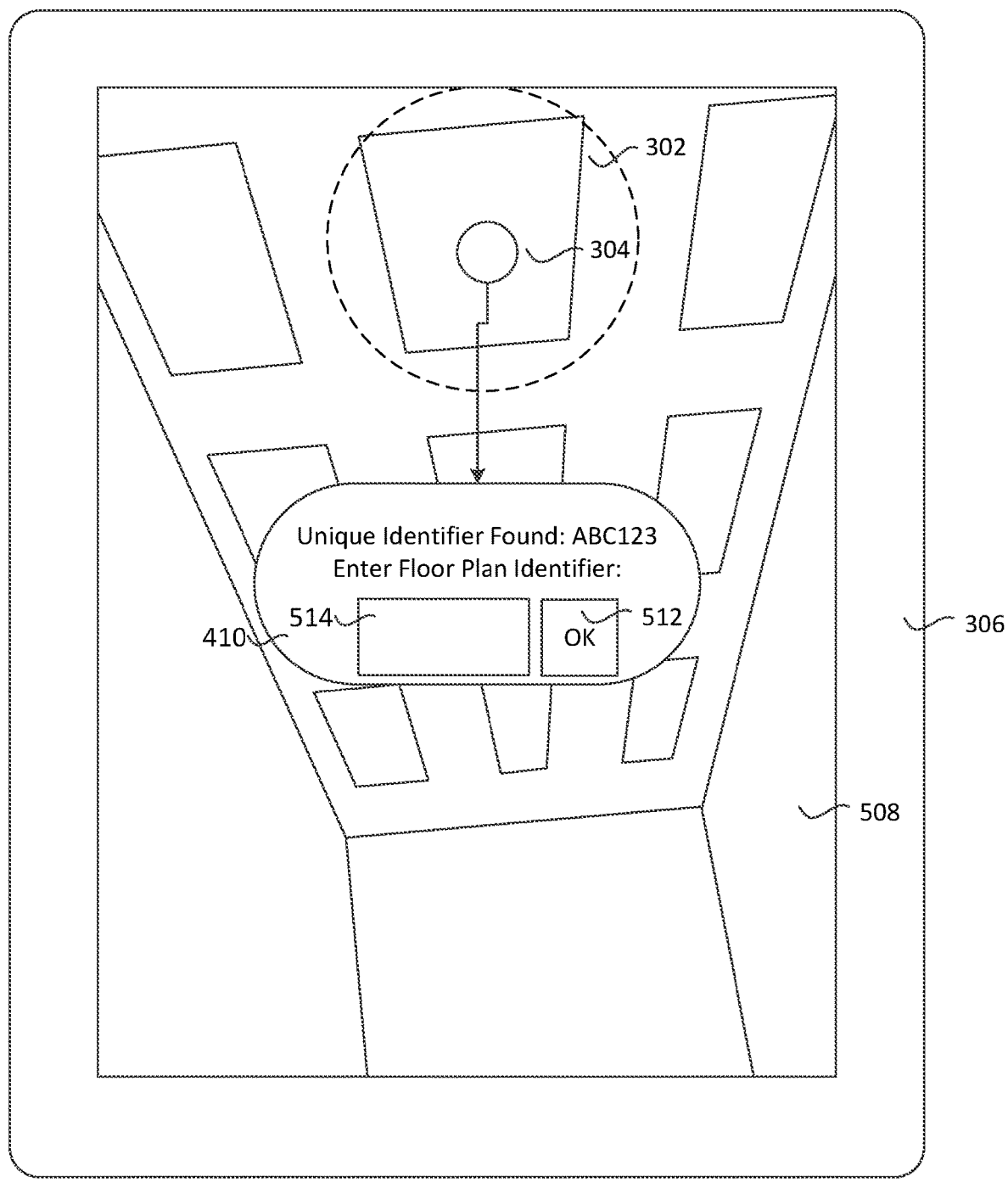
FIG. 5 depicts a representative image that may be displayed on a mobile device to associate the lighting fixture with a load control device.

FIG. 5 depicts an example image 508 that may be displayed on a mobile device to associate the unique identifier of a lighting control device with a floor plan identifier (e.g., at 208 of the method 200 of FIG. 2). The image 508 may represent a frame of a video generated by the mobile device 306, for example. The image 508 may include the lighting fixtures within a room, or a subset thereof. The popup window 410 may display a text box 514 and/or a confirmation button 512. The text box 514 and/or the confirmation button 512 may be displayed, e.g. instead of the commission button 412 shown in FIG. 4. The image 508 may be displayed on the mobile device 306 after the user has pressed the commission button 412 shown in FIG. 4. The user may enter a floor plan identifier into the text box 514. The floor plan identifier may be, for example, an alphanumeric sequence or other character sequence. The floor plan identifier may be determined from a blueprint or other drawing showing the floor plan of the building. After the user has entered a floor plan identifier into text box 514, the user may press the confirmation button 512. The mobile device 306 may associate the unique identifier of the lighting control device (not shown) connected to the lighting fixture 304 with the floor plan identifier entered by the user into the text box 514.

For example, a lighting control device may use the lighting load of the lighting fixture 304 to signal a unique identifier. The unique identifier may be, for example, "ABC123". The mobile device 306 may receive the signaled unique identifier. The mobile device 306 may indicate to the user that the unique identifier has been received. The mobile device 306 may prompt the user to commission the lighting control device. The user may indicate that they wish to commission the lighting control device by pressing the commission button 412 shown in FIG. 4. The mobile device 306 may prompt the user to enter a floor plan identifier in text box 514. The user may enter, for example, "Downlight 1" into text box 514. The floor plan identifier may be presented to the user automatically by the mobile device 306. The user may press the confirmation button 512 to confirm the correct entry of the floor plan identifier. Other floor plan data may be presented to, or entered by, the user. The mobile device 306 may associate the received unique identifier and the entered floor plan identifier (e.g., at 210 of the method 200 of FIG. 2). The association between the unique identifier and the floor plan identifier may be stored on the mobile device and/or on an external device (e.g., a server, a system controller, etc.).

Figure 6:
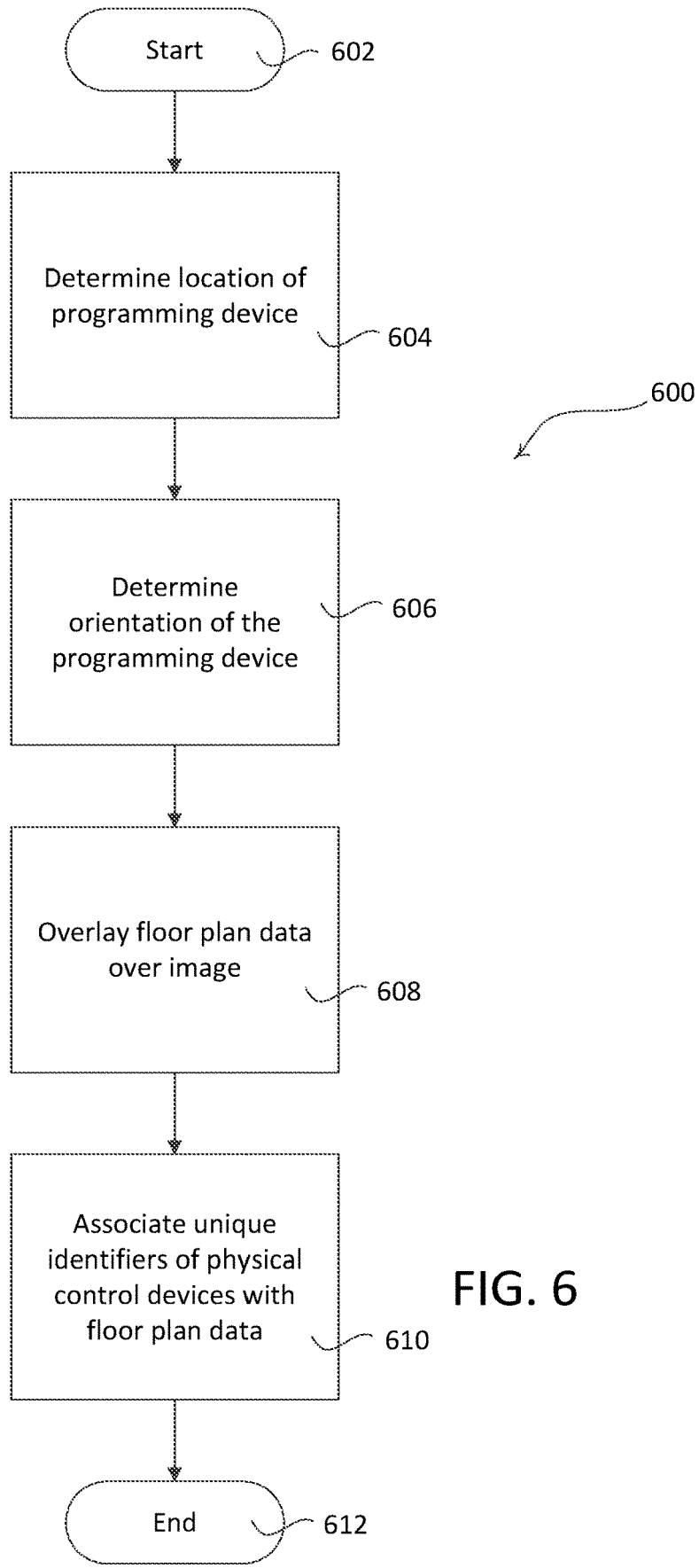
FIG. 6 is a flow diagram depicting an example method for identifying one or more lighting fixtures and associating them with load control devices using floor plan data.

FIG. 6 is a flow diagram depicting an example method 600 for identifying one or more lighting fixtures (e.g., lighting control devices control respective lighting loads of the lighting fixtures) and associating a unique identifier with a floor plan identifier of each of the lighting fixtures. The method 600 may start at 602. The method 600 may be performed on a programming device, such as a mobile device, or distributed across multiple programming devices, such as a mobile device, a system controller, or another device. At 604, a location of the mobile device 306 may be determined. For example, the location may be a room in a building such as an office, a conference room, a hallway, or any other space within a building. The location of the mobile device 306 may be determined automatically. For example, the location of the mobile device 306 may be determined by a real-time locating system executed on the mobile device 306 (e.g., GPS, triangulation, NFC, geolocation, etc.). The location of the mobile device 306 may be determined by user input (e.g., the user may select the correct location from a list of predefined locations). The location may be determined automatically and confirmed by the user.

Figure 9:
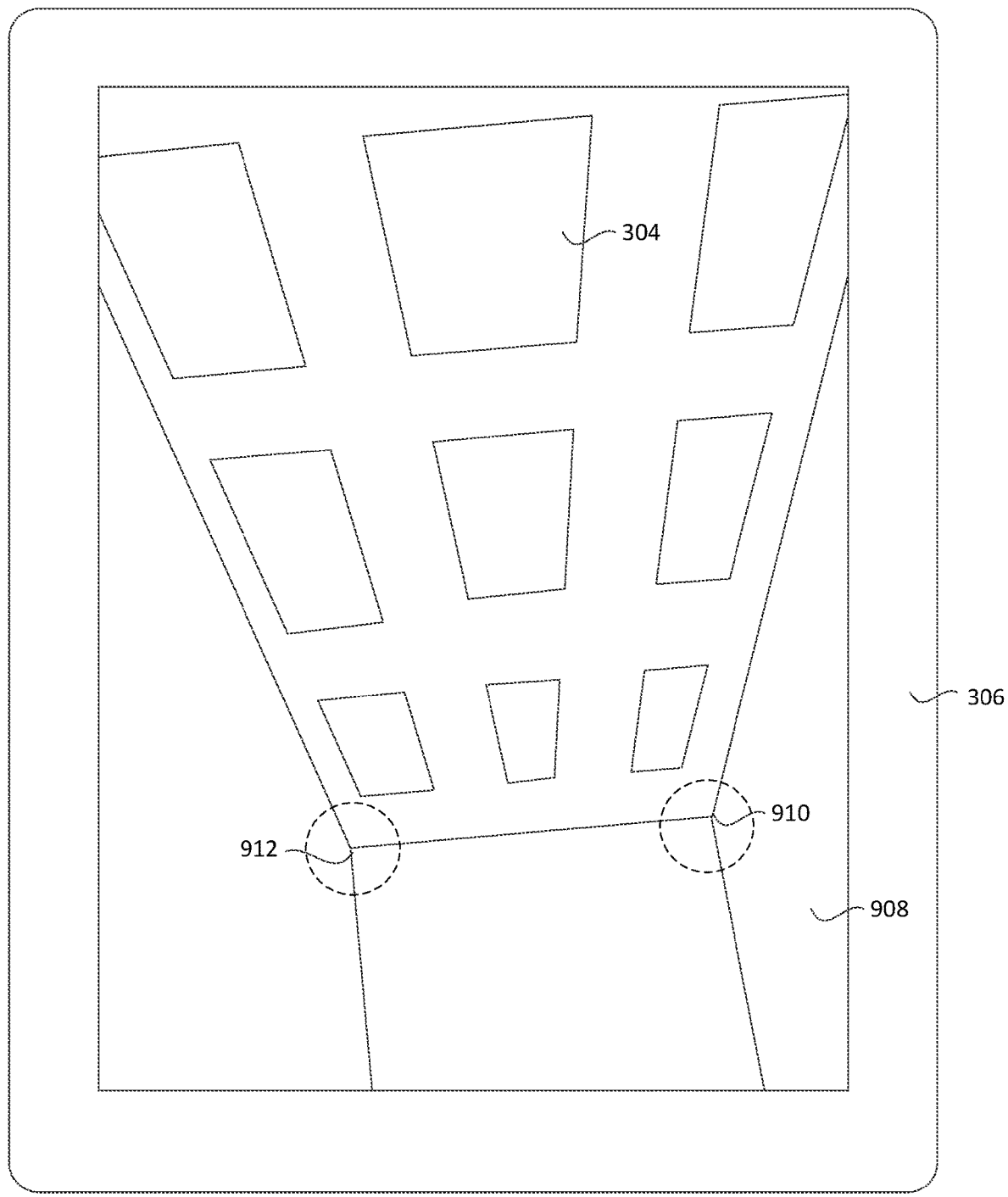
FIG. 9 depicts an example of using two or more objects within a given location to determine the orientation of a mobile device within the given location.

At 606, an orientation of the mobile device 306 (e.g., relative to other objects within the location) may be determined. The orientation may be determined by using real-time orientation sensors (e.g., a sensor such as an accelerometer, gyroscope, and/or any other sensor for detecting orientation on a mobile device). The orientation may be determined by user input. For example, the user may select the orientation. The mobile device 306 may prompt the user to make selections on a display of the mobile device 306 that indicate the orientation of the mobile device 306. The orientation may be determined by automatically detecting the relative location of two or more known objects within the location. The known objects may be, for example, corners of the room, windows, lighting fixtures, or other objects in the location. For example, as shown in FIG. 9, the mobile device 306 may determine its orientation by automatically detecting two corners of a room in which the mobile device 306 is located.

Referring again to FIG. 6, at 608, the mobile device 306 may overlay floor plan data onto an image 308 of the location. The floor plan data may correlate the physical lighting fixtures with corresponding floor plan identifiers. For example, each of the one or more lighting fixtures 304 may have a corresponding floor plan identifier in the floor plan data. The floor plan data may include one or more icons representing the physical location of the lighting fixtures, representations of connections to other devices (e.g., other lighting fixtures, switches, sensors, or other devices), group identifiers indicating groups of lighting control devices that may be controlled together, and/or a combination thereof. The floor plan data may include a floor plan identifier. The floor plan data may include programming and/or control information for controlling the lighting control devices at identified locations in the floor plan. The programming and/or control information may be uploaded to a system controller for controlling the lighting fixtures.

At 610, the mobile device 306 may receive one or more unique identifiers from the one or more lighting fixtures 304. For example, the mobile device may receive a separate unique identifier from each lighting fixture 304 within the location. A unique identifier may be generated by a lighting control device activating a lighting load of a corresponding lighting fixture 304. The mobile device 306 may associate the received unique identifiers with the corresponding floor plan identifiers. The association may be stored in a memory of the mobile device 306. The association may be transmitted by the mobile device 306 to an external device having a memory (e.g., a server, a system controller, or another external device) and stored on the external device. The association may be transmitted to the lighting control device and stored on a memory of the lighting control device. The method 600 may end at 612 and the associations may be used to configure and/or control the lighting loads in the lighting control system. For example, the user may select a lighting fixture on an image of the mobile device 306 that is identified by the floor plan identifier and may communicate configuration information and/or control instructions to the lighting control device of the lighting fixture using the unique identifier associated therewith. The communication may be performed directly, or via another device, such as a system controller.

Figure 7:
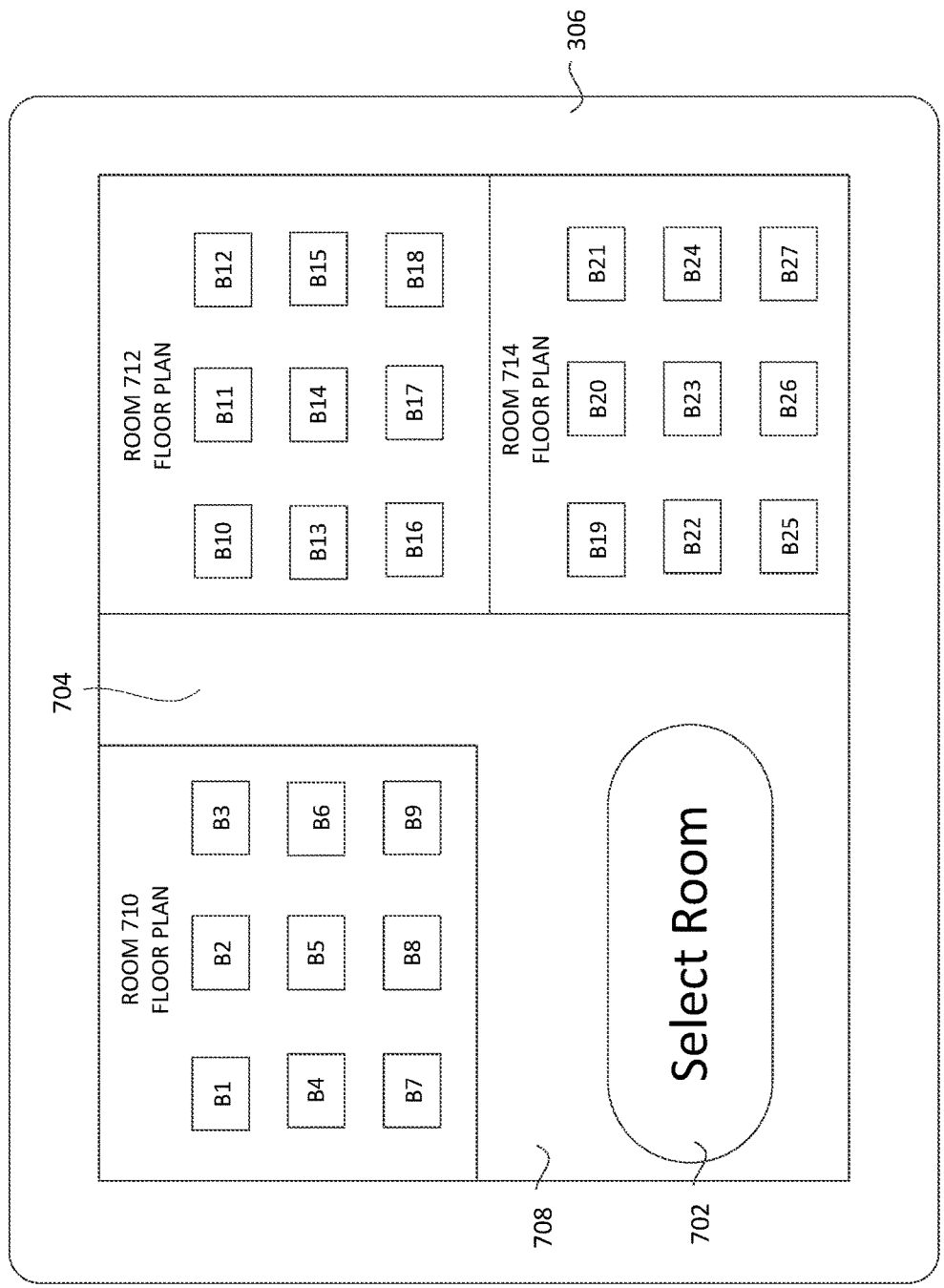
FIG. 7 depicts floor plans for identifying the physical location of a mobile device.

FIG. 7 depicts an example floor plan 704 for identifying the physical location of a mobile device (e.g., at 604 of the method 600 of FIG. 6). An image 708 may be displayed on a mobile device 306. The image 708 may depict one or more floor plans for a given location. The image 708 may display the floor plan 704 of a building. The floor plan 704 displayed on the image 708 may include depictions of one or more rooms 710, 712, and 714. Each room 710, 712, and 714 may reflect a location in which one or more lighting fixtures are installed, or are to be installed. For example, the location of one or more lighting fixtures B1-B27 within the rooms 710, 712, 714 may be depicted. The lighting fixtures B1-B27 may be installed a particular distance from other objects (e.g., walls, other lighting fixtures, etc.) in the room. Each of the lighting fixtures B1-B27 may be assigned a unique identifier (e.g., serial number, address, etc.) after installation for communicating with the lighting fixture.

The rooms 710, 712, and 714 may be on the same floor of a building or on different floors. A user of the mobile device 306 may select the room in which the mobile device 306 is located. For example, the user may select the room 710 as being the room in which the mobile device 306 is located. The user may select the room 710 by pressing a select room button 702 and then selecting, for example, room 710. Alternatively, the user may select the room 710 and confirm their choice by pressing the select room button 702. The user may select the room 710 by choosing it from a list of rooms.

Figure 8:
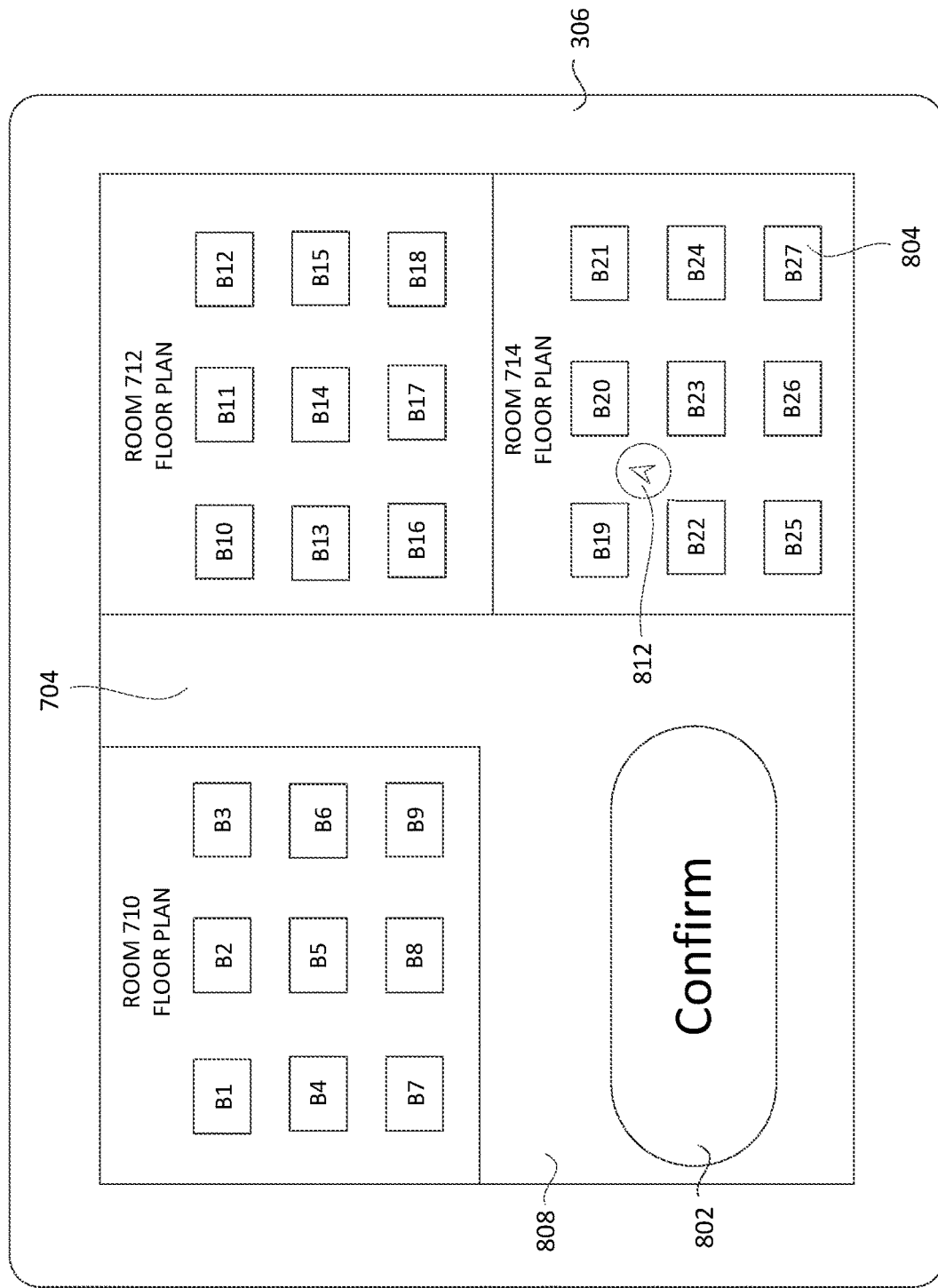
FIG. 8 depicts floor plans for identifying the orientation of a mobile device within a given location.

The location and/or orientation of the mobile device 306 may be determined and confirmed by the user. FIG. 8 depicts an example image 808 displayed on the mobile device 306 including the floor plan 704 for determining the location and/or orientation of the mobile device 306 within a given location (e.g., at 606 of the method 600 of FIG. 6). The floor plan 704 may include rooms of a building, such as the room 714, for example. The floor plan 704 may include one or more icons, such as icons 804, which may represent the physical locations of lighting fixtures (e.g., lighting fixture B27 in FIG. 8). The floor plan 704 may show the locations of the lighting fixtures as they relate to one another and/or other objects in the space (e.g., the relative positions of the lighting fixtures). The mobile device 306 and/or the system controller may have stored thereon a floor plan identifier that indicates the location of one or more of the lighting fixtures in the floor plan 704.

The location and/or orientation of the mobile device 306 may be determined based on input from the user. The floor plan 704 may include a mobile device icon, such as an icon 812, which may indicate the location and/or orientation of the mobile device 306. For example, the user may select a direction the user is facing on the floor plan 704. The location may be determined automatically using a real-time locating system (e.g., GPS, triangulation, etc.). The orientation may be determined automatically (e.g., using a real-time orientation sensors) and assisted by the user. The orientation may be determined based on user input indicating two or more defined portions of the room 714. The mobile device 306 may use a weighted calculation to determine its orientation. For example, the mobile device 306 may use data from GPS, an accelerometer, a gyroscope, an altimeter, a compass, or any combination thereof to determine its orientation. The user may confirm the determined location and/or orientation by pressing the confirm button 802. The mobile device 306 may use information from an internal camera to verify its orientation. The mobile device 306 may automatically determine the location and/or orientation without notifying the user.

FIG. 9 depicts an example image 908 of using two or more objects within a given location (e.g., a room of a building) to determine the orientation of a mobile device 306 within the given location (e.g., at 606 of the method 600 of FIG. 6). The image 908 may represent a frame of a video generated by the mobile device 306, for example. The image 908 may include the lighting fixtures within a location, or a subset thereof.

The mobile device 306 may determine its orientation based on two or more predetermined objects within the location. The predetermined objects may have a fixed position within the location. The mobile device 306 may determine its orientation using, for example, the position of the predetermined objects in relation to each other. The predetermined objects may be, for example, corners of a room, windows, lighting fixtures, or a combination thereof. The user may be prompted to select certain predetermined objects to orient the mobile device 306 within the location on the floor plan. For example, the mobile device 306 may prompt the user to select the two corners 910, 912 on the north wall of the identified room that meet the ceiling. The user may select the corners 910, 912 of the room to determine its orientation within the floor plan.

The mobile device 306 may measure the distance between the selected objects of orientation (e.g., 910, 912) and set the distance in the image 908 equal to the distance indicated between the objects in the floor plan data. This distance may be used to calculate the relative size of objects, and distance between objects, in the room of the image 908. The mobile device 306 may also, or alternatively, prompt the user to select two points of a predefined object within the room for which the distance is predetermined. For example, the mobile device 306 may prompt the user to select top and bottom corners of a door or wall having a standard size.

The mobile device 306 may use information of its orientation to determine its position within the floor plan relative to the predetermined objects in the image 908. The floor plan data may include distances between objects (e.g., walls, lighting fixtures, etc.) within the room. The mobile device 306 may track the size of objects and the distance between objects (e.g., corners, lighting fixtures, etc.) in the image 908 to identify one or more lighting fixtures. The mobile device 306 may identify lighting fixtures within an image based on the location/orientation of the mobile device relative to objects indicated in the floor plan data. For example, the mobile device 306 may identify lighting fixtures within an image based on the location/orientation of the mobile device, the size of the lighting fixtures, and/or the distance of the lighting fixtures from the selected objects of orientation (e.g., corners 910, 912).

Figure 10:
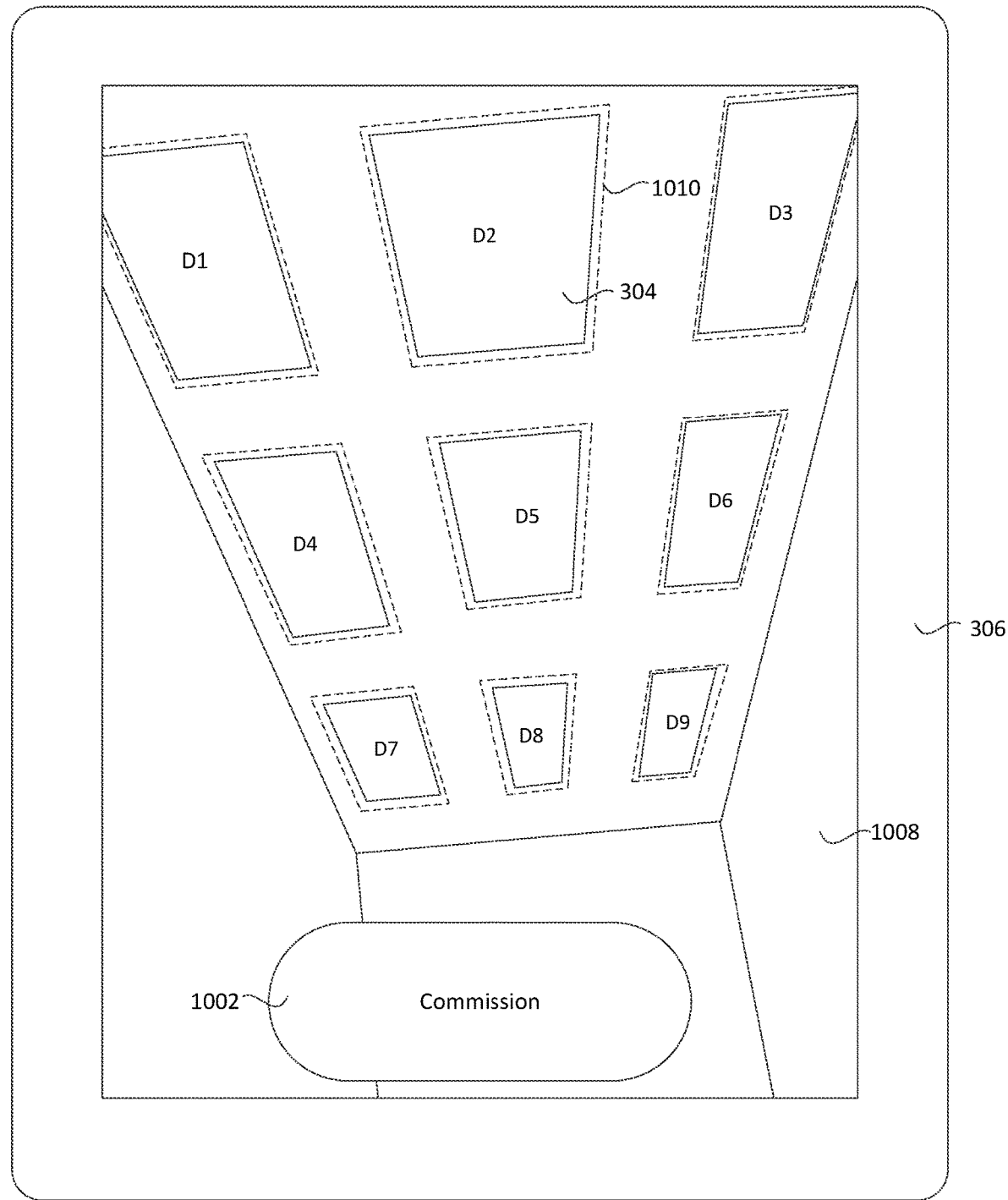
FIG. 10 depicts an example of identifying one or more lighting fixtures in a given location using overlaid floor plan data.

FIG. 10 depicts an example image 1008 identifying one or more lighting fixtures in a given location using overlaid floor plan data (e.g., at 608 of the method 600 of FIG. 6). The image 1008 may represent a frame of a video generated by the mobile device 306, for example. The image 1008 may include the lighting fixtures within a location, or a subset thereof. The mobile device 306 may identify the lighting fixtures within the location based on the size and/or location of the lighting fixtures from the points of reference. The mobile device 306 may determine which of the lighting fixtures indicated in the floor plan data are within the image 1008 based on the location of the mobile device 306, the orientation of the mobile device 306, and the floor plan data indicating the location of the lighting fixtures in the image. The mobile device 306 may identify one or more fixtures in the image as being fixtures in the floor plan data.

The mobile device 306 may overlay floor plan data onto the lighting fixtures displayed in image 1008. The floor plan data may be stored on a memory of the mobile device 306 and/or received from an external device, such as the system controller, for example. The floor plan data may identify floor plan identifiers that correspond with the physical location of the lighting fixtures. The floor plan data may include one or more floor plan identifiers (e.g., one floor plan identifier for each lighting fixture in the image 1008). The floor plan data may include one or more icons representing the physical location of the lighting fixtures, representations of connections to other devices (e.g., other lighting fixtures, switches, sensors, or other devices), group identifiers indicating groups of lighting control devices that may be controlled together, and/or a combination thereof. The floor plan data may include programming and/or control information for controlling the lighting control devices at identified locations in the floor plan. The programming and/or control information may be uploaded to a system controller for controlling the lighting fixtures. The mobile device 306 may overlay an outline 1010 identifying the lighting fixture in the corresponding location in the floor plan data. The mobile device 306 may overlay floor plan identifier D2 onto lighting fixture 304. The mobile device 306 may prompt the user to confirm that the overlaid floor plan data is correct.

The mobile device 306 may receive one or more unique identifiers from the one or more lighting fixtures. A unique identifier may identify a lighting control device (not shown) associated with a lighting fixture. For example, the mobile device 306 may receive a separate unique identifier from each lighting fixture within the location. A unique identifier may be used to communicate with a lighting control device activating a lighting load of a corresponding lighting fixture 304.

The mobile device 306 may prompt the user to commission the lighting control devices in the fixtures by pressing a commission button 1002. The lighting control devices may be commissioned by associating the floor plan identifiers of the lighting fixtures with the unique identifiers assigned to the lighting control devices for performing load control and other communication with the lighting control devices. After selection of the commission button 1002, the mobile device 306 may automatically detect the unique identifiers that correspond to the lighting control devices of the lighting fixtures in the image (e.g., via VLC or RF), as described herein.

The unique identifiers may be communicated via VLC signals. The mobile device 306 may analyze incoming video or frames of the video to detect unique identifiers indicated by the lighting loads of the lighting fixtures. For example, the mobile device 306 may receive the signal from the lighting load of the lighting fixture 304 and may identify the unique identifier being signaled. The unique identifier of the lighting control device may be signaled by blinking the lighting load of the lighting fixture 304 in a pattern, sequence, rate, or the like that corresponds to the unique identifier. The unique identifiers may be sent by the lighting loads of the lighting fixtures and detected by a camera of the mobile device 306 at a frequency that is imperceivable to the human eye.

The unique identifiers may be communicated via RF signals. The mobile device 306 may receive the RF signals from the lighting control devices and determine the unique identifiers based on the received signals. The RF signals may be, for example, a WI-FI® signal, a BLUETOOTH® signal, a near field communication (NFC) signal, a ZIGBEE® signal, a CLEAR CONNECT™ signal, or another RF signal. The mobile device 306 may receive unique identifiers from more than one lighting control device at the same time. The mobile device 306 may use, for example, received signal strength to determine which unique identifier was sent by which lighting control device. For example, the mobile device 306 may determine that the unique identifier associated with the strongest RF signal was received from the lighting control device that is physically closest to the mobile device 306 in the image (e.g., the lighting control device in the largest lighting fixture). The mobile device 306 may use input from the user to determine which lighting control device is closest to the mobile device 306. For example, the mobile device 306 may prompt the user to select the lighting control device that is closest to the mobile device 306.

Once the mobile device 306 has received the unique identifiers, the mobile device 306 may associate the unique identifiers of the lighting control devices in the image with the lighting control devices indicated in the corresponding floor plan data (e.g., at 610 of the method 600 of FIG. 6). For example, the mobile device 306 may make associations between the unique identifiers and the floor plan identifiers. The mobile device may prompt the user to confirm one or more associations (e.g., each association). The mobile device 306 may highlight or otherwise denote lighting fixtures that have been successfully associated. The mobile device 306 may indicate to the user that each association has been made correctly. The user may correct an incorrect association made by the mobile device 306. The associations may be stored in a memory of the mobile device 306. The associations may be transmitted by the mobile device 306 to an external device having a memory (e.g., a server, a system controller, etc.) and stored on the external device. Associations may be transmitted to the lighting control devices and stored on memories of the lighting control devices. The associations may be used to configure and/or control the lighting loads in the lighting control system. For example, information may be communicated to and/or from lighting control devices using the floor plan identifier, or the unique identifier of a device may be identified for sending a message to a lighting control device having an identified floor plan identifier. For example, the mobile device 304 or the system controller may communicate digital messages to the lighting fixture 304 using the unique identifier that is associated with the floor plan identifier "D4".

Figure 11:
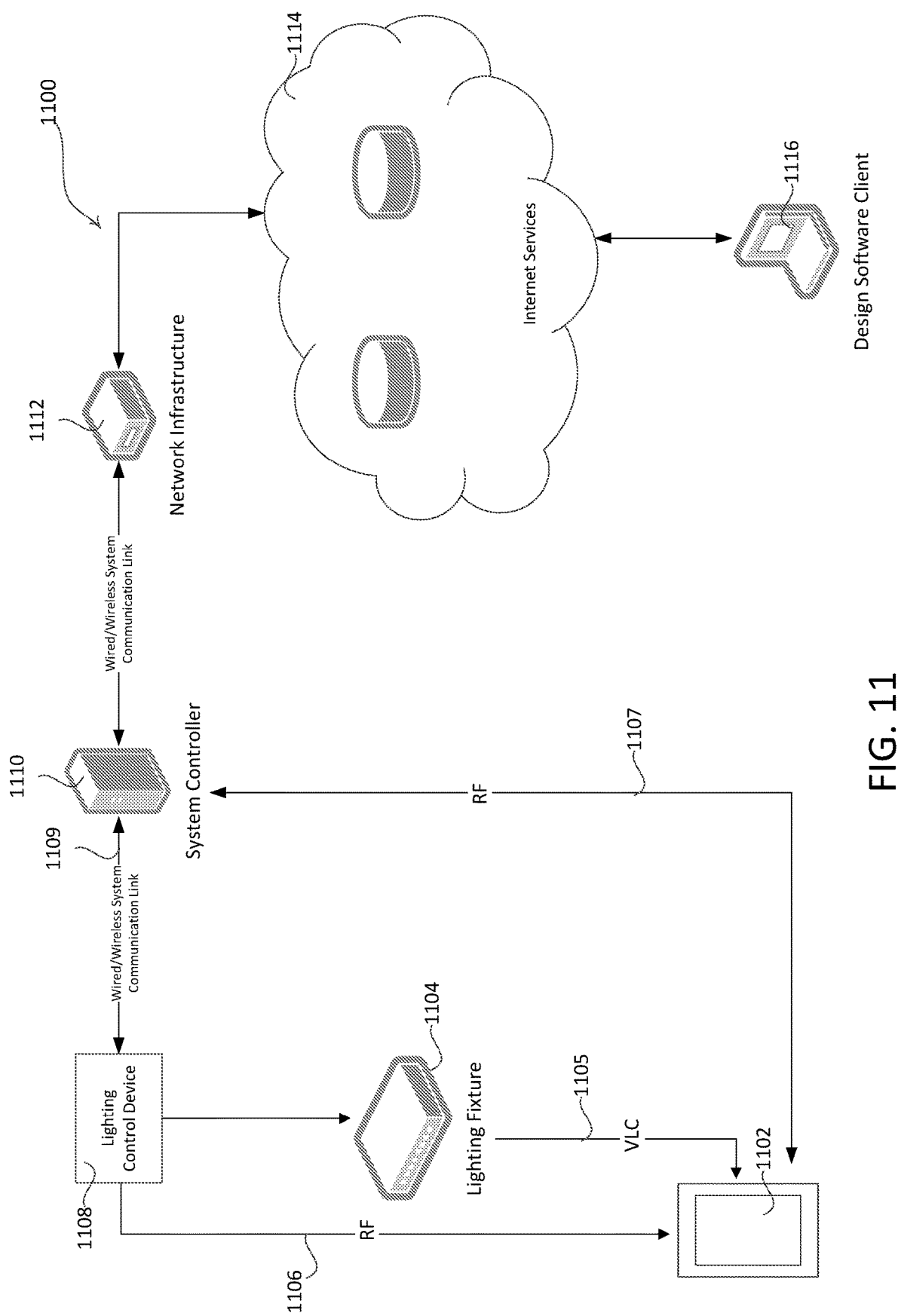
FIG. 11 shows an example system architecture.

FIG. 11 shows an example system architecture 1100 as described herein. The system architecture 1100 may include a mobile device 1102. The mobile device 1102 may be, for example, a cell phone, a laptop or tablet computer, or a wearable device (e.g., wearable computer glasses. The mobile device 1102 may have an internal camera capable of capturing signals on the VLC communication link 1105 from a lighting fixture 1104 or other light source. The mobile device 1102 may include a communication circuit (e.g., receiver, transceiver, etc.) capable of receiving communications via the RF communication link 1106.

The mobile device 1102 may receive information (e.g., a unique identifier) from a lighting control device 1108 installed in a lighting fixture 1104 for controlling a lighting load. The information may be communicated by VLC (e.g., LiFi) on the VLC communication link 1105 and/or by RF on the RF communication link 1106 (e.g., WI-FI®, BLUETOOTH®, near field communication (NFC), ZIGBEE®, or CLEAR CONNECT™). The lighting control device 1108 may be installed in the lighting fixture 1104 and may control a lighting load to produce VLC signals on the VLC communication link 1105 at a rate imperceivable to the human eye. The lighting control device 1108 may include a communication circuit (e.g., transmitter, transceiver, etc.) that is capable of communicating via the RF communication link 1106. The information included on the VLC communication link 1105 or the RF communication link 1106 may be unique to the lighting control device 1108.

The lighting control device 1108 may be connected to a system controller 1110 (e.g., a hub). The lighting control device 1108 may be connected to the system controller 1110 via a wired communication link (e.g., Ethernet or other wired network communication link) and/or wireless communication link 1109 (e.g., Bluetooth®, WI-FI®, WiMAX®, HSPA+, LTE, 5G, or another wireless communication link). The lighting control device 1108 may send information to and/or receive information from the system controller 1110 via the wired and/or wireless communication link 1109. For example, the lighting control device 1108 may be programmed with a unique identifier, which is received from the system controller 1110, for sending and/or receiving digital messages. The association of the unique identifier with the floor plan identifier may also be communicated from the system controller 110 to the lighting control device 1108 via the wired and/or wireless communication link 1109.

The system controller 1110 may communicate with the mobile device 1102 via an RF communication link 1107. The RF communication link 1107 may include communications using Bluetooth®, WI-FI®, WiMAX®, HSPA+, LTE, 5G, or another wireless communication signal. Though shown as a wireless communication link, the RF communication link 1107 may be replaced with a wired communication link, such as Ethernet. The mobile device 1102 may receive floor plan data or other system information via the RF communication link 1107. The mobile device 1102 may send unique identifiers and/or association information comprising an association between unique identifiers and floor plan data via the RF communication link 1107. The mobile device 1102 may also, or alternatively, communicate directly with a network infrastructure or Internet services to send and/or receive information.

The system controller 1110 may be connected to network infrastructure 1112, e.g. by a wired communication link (e.g., Ethernet or other wired network communication link) and/or wireless communication link 1109 (e.g., Bluetooth®, WI-FI®, WiMAX®, HSPA+, LTE, 5G, or another wireless communication link). The network infrastructure 1112 may use internet services 1114 for sending information to and/or receiving information from remote computing devices.

The internet services 1114 may be used to communicate with a design software client 1116. The design software client 1116 may be used to program and/or store the floor plan data. The system controller 1110 may receive information from and send information to the design software client 1116 via the network infrastructure 1112 and/or the internet services 1114. For example, the system controller 1110, or other devices in the system, may access the floor plan data, or portions thereof, by request from the design software client.

Figure 12:
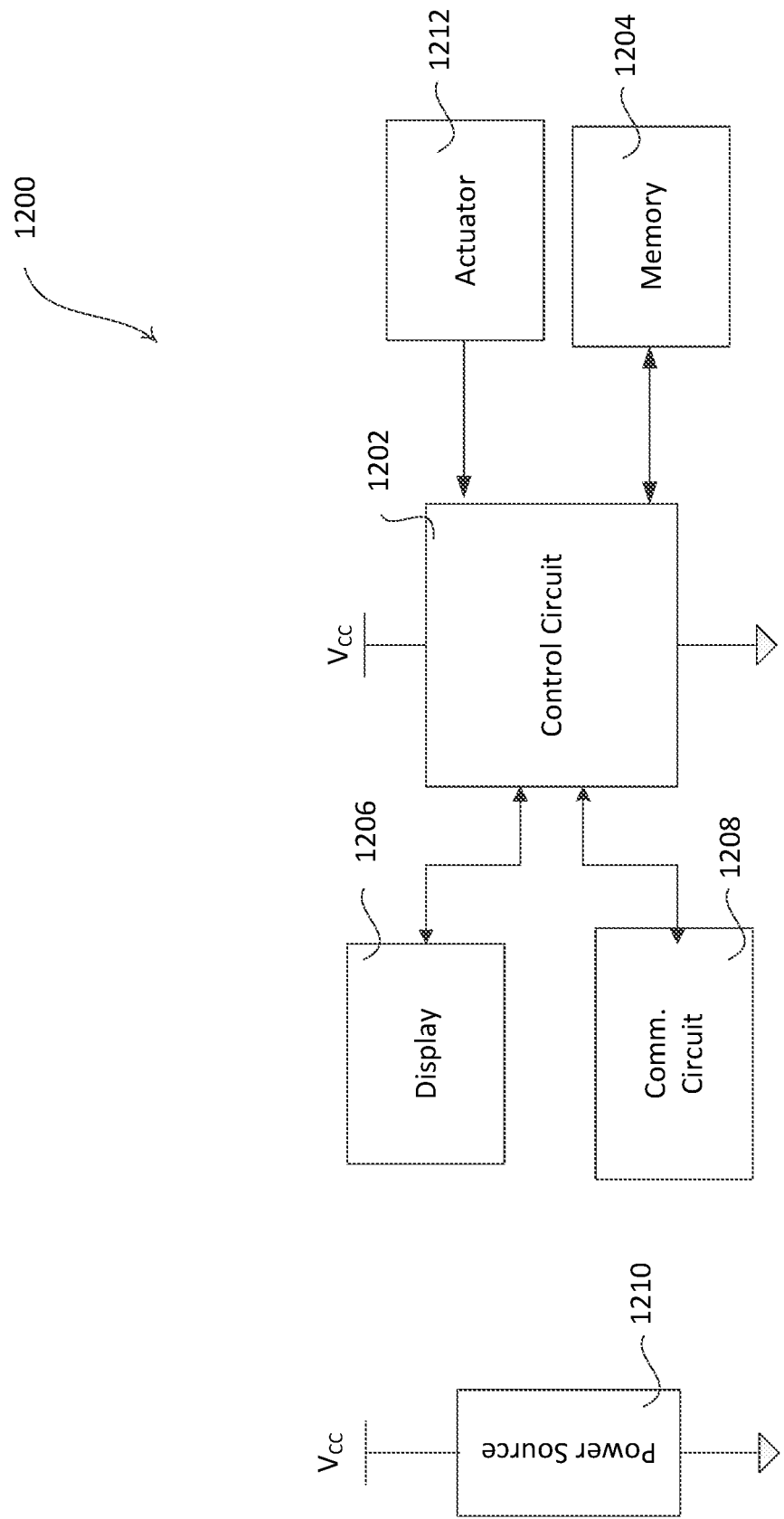
FIG. 12 is a block diagram of an example mobile device.

FIG. 12 is a block diagram illustrating an example mobile device 1200 as described herein. The mobile device 1200 may include the mobile device 124, for example. The mobile device 1200 may include a control circuit 1202 for controlling the functionality of the mobile device 1200. The control circuit 1202 may include one or more general purpose processors, special purpose processors, conventional processors, digital signal processors (DSPs), microprocessors, integrated circuits, a programmable logic device (PLD), application specific integrated circuits (ASICs), or the like. The control circuit 1202 may perform signal coding, data processing, power control, input/output processing, or any other functionality that enables the mobile device 1200 to perform as described herein. The control circuit 1202 may store information in and/or retrieve information from the memory 1204. The memory 1204 may include a non-removable memory and/or a removable memory. The non-removable memory may include random-access memory (RAM), read-only memory (ROM), a hard disk, or any other type of non-removable memory storage. The removable memory may include a subscriber identity module (SIM) card, a memory stick, a memory card, or any other type of removable memory.

The mobile device 1200 may include a communications circuit 1208 for transmitting and/or receiving information. The communications circuit 1208 may perform wireless and/or wired communications. The communications circuit 1208 may include an RF transceiver or other circuit capable of performing wireless communications via an antenna. Communications circuit 1208 may be in communication with control circuit 1202 for transmitting and/or receiving information.

The control circuit 1202 may also be in communication with a display 1206 for providing information to a user. The control circuit 1202 and/or the display 1206 may generate GUIs for being displayed on the mobile device 1200. The display 1206 and the control circuit 1202 may be in two-way communication, as the display 1206 may include a touch screen module capable of receiving information from a user and providing such information to the control circuit 1202. The mobile device may also include an actuator 1212 (e.g., one or more buttons) that may be actuated by a user to communicate user selections to the control circuit 1202.

Each of the modules within the mobile device 1200 may be powered by a power source 1210. The power source 1210 may include an AC power supply or DC power supply, for example. The power source 1210 may generate a supply voltage $V_{CC}$ for powering the modules within the mobile device 1200.

Figure 13:
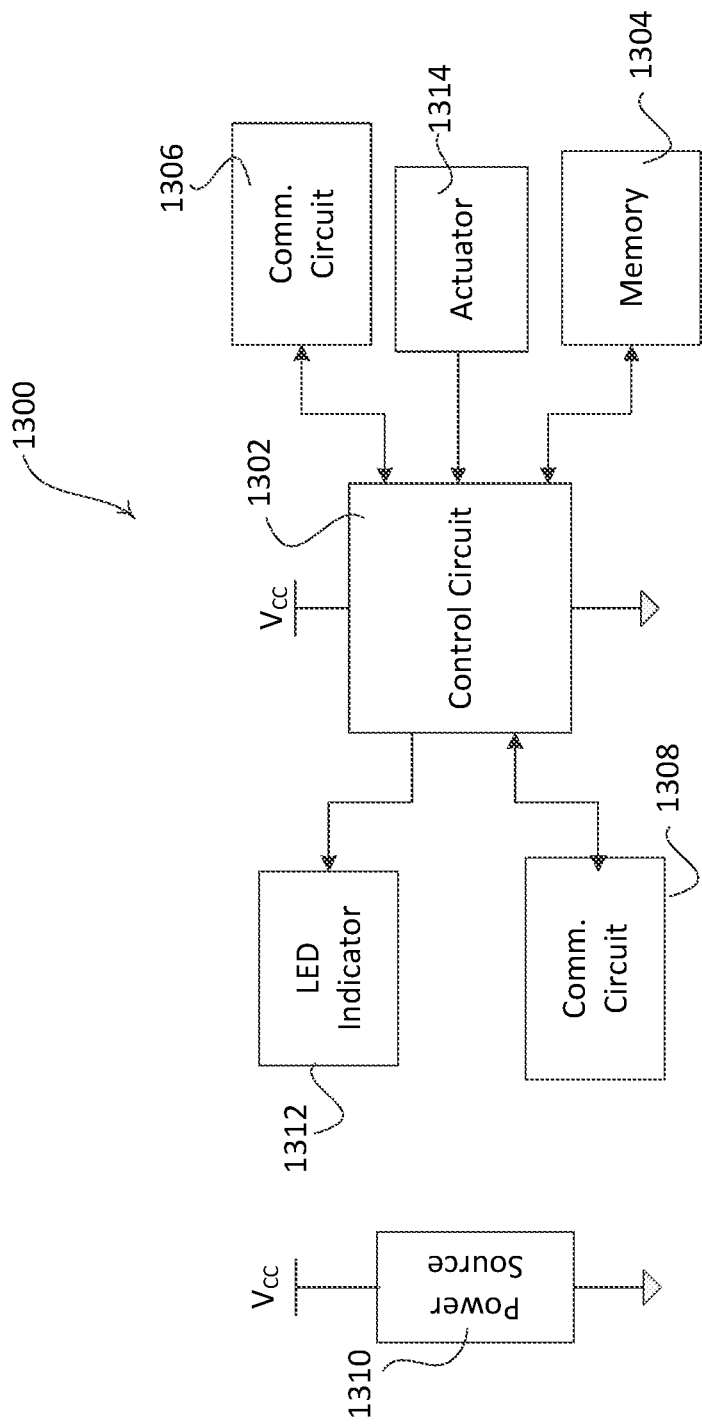
FIG. 13 is a block diagram of an example system controller.

FIG. 13 is a block diagram illustrating an example system controller 1300 as described herein. The system controller may be a gateway system controller, a target system controller, a remote system controller, and/or a combination thereof. The system controller 1300 may include a control circuit 1302 for controlling the functionality of the system controller 1300. The control circuit 1302 may include one or more general purpose processors, special purpose processors, conventional processors, digital signal processors (DSPs), microprocessors, integrated circuits, a programmable logic device (PLD), application specific integrated circuits (ASICs), or the like. The control circuit 1302 may perform signal coding, data processing, power control, input/output processing, or any other functionality that enables the system controller 1300 to perform as described herein. The control circuit 1302 may store information in and/or retrieve information from the memory 1304. The memory 1304 may include a non-removable memory and/or a removable memory. The non-removable memory may include random-access memory (RAM), read-only memory (ROM), a hard disk, or any other type of non-removable memory storage. The removable memory may include a subscriber identity module (SIM) card, a memory stick, a memory card, or any other type of removable memory.

The system controller 1300 may include a communications circuit 1306 for transmitting and/or receiving information. The communications circuit 1306 may perform wireless and/or wired communications. The system controller 1300 may also, or alternatively, include a communications circuit 1308 for transmitting and/or receiving information. The communications circuit 1306 may perform wireless and/or wired communications. Communications circuits 1306 and 1308 may be in communication with control circuit 1302. The communications circuits 1306 and 1308 may include RF transceivers or other communications modules capable of performing wireless communications via an antenna. The communications circuit 1306 and communications circuit 1308 may be capable of performing communications via the same communication channels or different communication channels. For example, the communications circuit 1306 may be capable of communicating (e.g., with a mobile device, over a network, etc.) via a wireless communication channel (e.g., BLUETOOTH®, near field communication (NFC), WIFI®, WI-MAX®, cellular, etc.) and the communications circuit 1308 may be capable of communicating (e.g., with control devices and/or other devices in the load control system) via another wireless communication channel (e.g., WI-FI® or a proprietary communication channel, such as CLEAR CONNECT™).

The control circuit 1302 may be in communication with an LED indicator 1312 for providing indications to a user. The control circuit 1302 may be in communication with an actuator 1314 (e.g., one or more buttons) that may be actuated by a user to communicate user selections to the control circuit 1302. For example, the actuator 1314 may be actuated to put the control circuit 1302 in an association mode and/or communicate association messages from the system controller 1300.

Each of the modules within the system controller 1300 may be powered by a power source 1310. The power source 1310 may include an AC power supply or DC power supply, for example. The power source 1310 may generate a supply voltage $V_{CC}$ for powering the modules within the system controller 1300.

Figure 14:
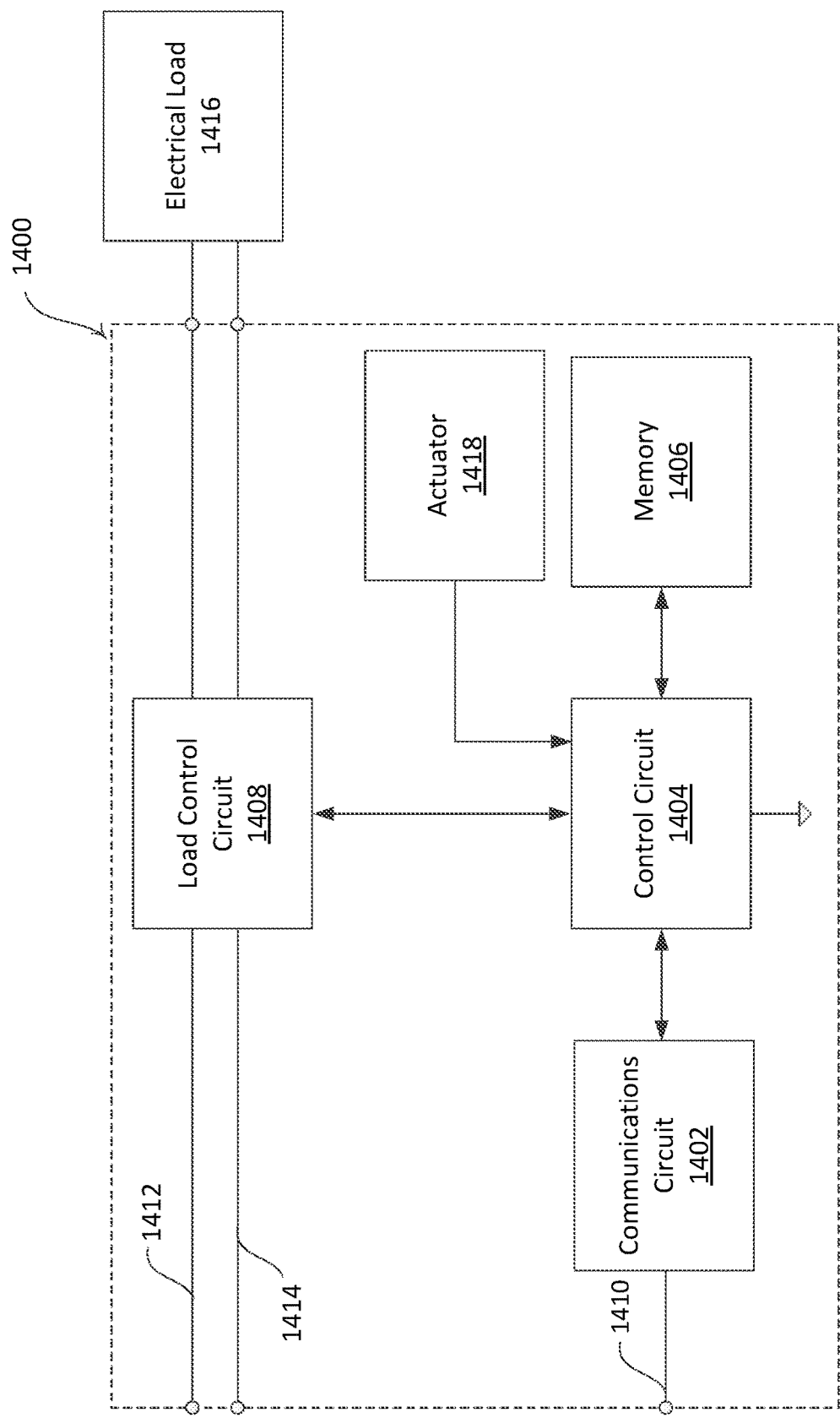
FIG. 14 is a block diagram depicting an example load control device.

FIG. 14 is a block diagram illustrating an example control-target device, e.g., a load control device 1400, as described herein. The load control device 1400 may be a dimmer switch, an electronic switch, an electronic lighting control device for lamps, an LED driver for LED light sources or other lighting control device, an AC plug-in load control device, a temperature control device (e.g., a thermostat), a motor drive unit for a motorized window treatment, or other load control device. The load control device 1400 may include a communications circuit 1402. The communications circuit 1402 may include a receiver, an RF transceiver, or other communications module capable of performing wired and/or wireless communications via communications link 1410. The communications circuit 1402 may be in communication with control circuit 1404. The control circuit 1404 may include one or more general purpose processors, special purpose processors, conventional processors, digital signal processors (DSPs), microprocessors, integrated circuits, a programmable logic device (PLD), application specific integrated circuits (ASICs), or the like. The control circuit 1404 may perform signal coding, data processing, power control, input/output processing, or any other functionality that enables the load control device 1400 to perform as described herein.

The control circuit 1404 may store information in and/or retrieve information from the memory 1406. For example, the memory 1406 may maintain a registry of associated control devices and/or control configuration instructions. The memory 1406 may include a non-removable memory and/or a removable memory. The load control circuit 1408 may receive instructions from the control circuit 1404 and may control an electrical load 1416 based on the received instructions. The load control circuit 1408 may send status feedback to the control circuit 1404 regarding the status of the electrical load 1416. The load control circuit 1408 may receive power via the hot connection 1412 and the neutral connection 1414 and may provide an amount of power to the electrical load 1416. The electrical load 1416 may include any type of electrical load, such as a lighting load (e.g., LED, fluorescent lamp, etc.).

The control circuit 1404 may be in communication with an actuator 1418 (e.g., one or more buttons) that may be actuated by a user to communicate user selections to the control circuit 1404. For example, the actuator 1418 may be actuated to put the control circuit 1404 in an association mode and/or communicate association messages from the load control device 1400.

What is claimed is:

1. A device comprising:
   a communication circuit;
   a display;
   a camera configured to capture an image, wherein the image comprises a lighting fixture at a location of the device; and
   a control circuit configured to:
   determine the location of the device;
   determine an orientation of the device at the location;
   overlay floor plan data over the lighting fixture in the image on the display based on the location and orientation of the device, wherein the floor plan data comprises a floor plan identifier that identifies the lighting fixture on a floor plan;
   receive, via one or more of the communication circuit or the camera, a unique identifier of a lighting control device associated with the lighting fixture, wherein the unique identifier is configured to identify the lighting control device in messages transmitted to control an amount of power provided to a lighting load in the lighting fixture; and
   perform at least one of the following:
   associate the unique identifier of the lighting control device with the floor plan identifier; or
   transmit the unique identifier of the lighting control device and the floor plan identifier to another device for association.

2. The device of claim 1, wherein the location is a room of a building.

3. The device of claim 1, wherein the control circuit is configured to determine the location from an indication of a selection on a list of locations or the floor plan displayed on the display.

4. The device of claim 1, wherein the control circuit is configured to determine the location automatically via a real-time locating system.

5. The device of claim 4, wherein the control circuit is further configured to prompt a user of the device to confirm that the automatically-determined location is correct.

6. The device of claim 1, wherein the control circuit is configured to determine the orientation of the device automatically by identifying predefined objects within the image of the location or another image of the location.

7. The device of claim 6, wherein the predefined objects within the image of the location comprise the corners of a room, lighting fixtures, or windows.

8. The device of claim 1, wherein the control circuit is configured to determine the orientation based on at least two predefined objects within the image of the location.

9. The device of claim 1, wherein the control circuit is configured to determine the orientation based on an indication from a user.

10. The device of claim 1, wherein the floor plan data comprises at least one of an icon representing a physical location of the lighting fixture, a representation of a connection between the lighting control device and another device, or a group identifier that indicates a group of lighting control devices that may be controlled together.

11. The device of claim 1, wherein the device is a set of wearable computer glasses.

12. The device of claim 1, wherein the control circuit is configured to determine the orientation by measuring a distance between two or more predefined objects within the image of the location and identifying the distance as corresponding to a distance in the floor plan of the location, the control circuit being further configured to use the measured distance to identify the lighting fixture as corresponding to a floor plan lighting fixture in the floor plan.

13. The device of claim 1, wherein the device further comprises a memory, and wherein the control circuit is configured to associate the unique identifier of the lighting control device with the floor plan identifier by storing an association between the unique identifier and the floor plan identifier in the memory.

14. The device of claim 13, wherein the control circuit is further configured to prompt a user of the device to confirm that the association is correct.

15. The device of claim 1, wherein the camera is further configured to receive the unique identifier of the lighting control device via visible light communication (VLC).

16. The device of claim 1, wherein the communication circuit is configured to receive the unique identifier of the lighting control device via radio frequency (RF) signals.

17. The device of claim 1, wherein the control circuit is further configured to send a digital message that comprises control instructions configured to control the lighting control device via the communication circuit, wherein the digital message comprises at least one of the unique identifier or the floor plan identifier.

18. The device of claim 1, wherein the other device comprises a system controller.

19. A device comprising:
a communication circuit;
a camera configured to capture an image, wherein the image comprises a lighting fixture within a location of the image; and
a control circuit configured to:
  receive, via one or more of the communication circuit or the camera, a unique identifier of a lighting control device associated with the lighting fixture, wherein the unique identifier is configured to identify the lighting control device in messages transmitted to control an amount of power provided to a lighting load in the lighting fixture;
  prompt a user to provide a floor plan identifier that identifies the lighting fixture on a floor plan;
  receive the floor plan identifier; and
  perform at least one of the following:
    associate the unique identifier of the lighting control device with the floor plan identifier; or
    transmit the unique identifier of the lighting control device and the floor plan identifier to another device for association.

20. The device of claim 19, wherein the device is a set of wearable computer glasses.

21. The device of claim 19, wherein the camera is configured to receive the unique identifier of the lighting control device via visible light communication (VLC).

22. The device of claim 21, wherein the camera is configured to receive the unique identifier at a frequency that is imperceivable to the human eye.

23. The device of claim 19, wherein the floor plan identifier is an alphanumeric string entered by the user.

24. The device of claim 19, wherein the floor plan identifier is received based on a selection of the user.

25. The device of claim 19, wherein the communication circuit is configured to receive the unique identifier of the lighting control device via radio frequency (RF) signals.

26. The device of claim 19, wherein the control circuit is further configured to transmit a digital message comprising control instructions configured to control the lighting control device via the communication circuit, wherein the digital message comprises one or more of the unique identifier of the lighting control device or the floor plan identifier.

27. The device of claim 19, wherein the other device comprises a system controller.

28. One or more non-transitory computer readable media having instructions stored thereon that, when executed by a control circuit, cause the control circuit to:
determine a location of a device;
determine an orientation of the device at the location;
capture, via a camera, an image, wherein the image comprises a lighting fixture at the location;
overlay floor plan data over the lighting fixture in the image on the display based on the location and orientation of the device, wherein the floor plan data comprises a floor plan identifier that identifies the lighting fixture on a floor plan;
receive, via one or more of a communication circuit or the camera, a unique identifier of a lighting control device associated with the lighting fixture, wherein the unique identifier is configured to identify the lighting control device in messages transmitted to control an amount of power provided to a lighting load in the lighting fixture; and
perform at least one of the following:
  associate the unique identifier of the lighting control device with the floor plan identifier; or
  transmit the unique identifier of the lighting control device and the floor plan identifier to another device for association.

29. The one or more non-transitory computer readable media of claim 28, wherein the location is a room of a building.

30. The one or more non-transitory computer readable media of claim 28, wherein the instructions, when executed by the control circuit, cause the control circuit to determine the location from an indication of a selection on a list of locations or the floor plan displayed on the display.

31. The one or more non-transitory computer readable media of claim 28, wherein the instructions, when executed by the control circuit, cause the control circuit to determine the location automatically via a real-time locating system.

32. The one or more non-transitory computer readable media of claim 31, wherein the instructions, when executed by the control circuit, further cause the control circuit to prompt a user of the device to confirm that the automatically-determined location is correct.

33. The one or more non-transitory computer readable media of claim 28, wherein the instructions, when executed by the control circuit, cause the control circuit to determine the orientation of the device automatically by identifying predefined objects within the image of the location or another image of the location.

34. The one or more non-transitory computer readable media of claim 33, wherein the predefined objects within the image of the location comprise the corners of a room, lighting fixtures, or windows.

35. The one or more non-transitory computer readable media of claim 28, wherein the instructions, when executed by the control circuit, cause the control circuit to determine the orientation based on at least two predefined objects within the image of the location.

36. The one or more non-transitory computer readable media of claim 28, wherein the instructions, when executed by the control circuit, cause the control circuit to determine the orientation based on an indication from a user.

37. The one or more non-transitory computer readable media of claim 28, wherein the floor plan data comprises at least one of an icon representing a physical location of the lighting fixture, a representation of a connection between the lighting control device and another device, or a group identifier that indicates a group of lighting control devices that may be controlled together.

38. The one or more non-transitory computer readable media of claim 28, wherein the device is a set of wearable computer glasses.

39. The one or more non-transitory computer readable media of claim 28, wherein the instructions, when executed by the control circuit, cause the control circuit to determine the orientation by measuring a distance between two or more predefined objects within the image of the location and identifying the distance as corresponding to a distance in the floor plan of the location, and wherein the instructions, when executed by the control circuit, further cause the control circuit to use the measured distance to identify the lighting fixture as corresponding to a floor plan lighting fixture in the floor plan.

40. The one or more non-transitory computer readable media of claim 28, wherein the device further comprises a memory, and wherein the instructions, when executed by the control circuit, cause the control circuit to associate the unique identifier of the lighting control device with the floor plan identifier by storing an association between the unique identifier and the floor plan identifier in the memory.

41. The one or more non-transitory computer readable media of claim 28, wherein the instructions, when executed by the control circuit, further cause the control circuit to prompt a user of the device to confirm that the association is correct.

42. The one or more non-transitory computer readable media of claim 28, wherein the instructions, when executed by the control circuit, cause the control circuit to receive the unique identifier of the lighting control device via visible light communication (VLC).

43. The one or more non-transitory computer readable media of claim 28, wherein the instructions, when executed by the control circuit, cause the control circuit to receive the unique identifier of the lighting control device via radio frequency (RF) signals.

44. The one or more non-transitory computer readable media of claim 28, wherein the instructions, when executed by the control circuit, cause the control circuit to send a digital message that comprises control instructions configured to control the lighting control device via the communication circuit, wherein the digital message comprises at least one of the unique identifier or the floor plan identifier.

45. The one or more non-transitory computer readable media of claim 28, wherein the other device comprises a system controller.

46. One or more non-transitory computer readable media having instructions stored thereon that, when executed by a control circuit, cause the control circuit to:
    capture, via a camera, an image, wherein the image comprises a lighting fixture within a location of the image;
    receive, via one or more of a communication circuit or the camera, a unique identifier of a lighting control device associated with the lighting fixture, wherein the unique identifier is configured to identify the lighting control device in messages transmitted to control an amount of power provided to a lighting load in the lighting fixture;
    prompt a user to provide a floor plan identifier that identifies the lighting fixture on a floor plan;
    receive the floor plan identifier; and
    perform at least one of the following:
        associate the unique identifier of the lighting control device with the floor plan identifier; or
        transmit the unique identifier of the lighting control device and the floor plan identifier to another device for association.

47. The one or more non-transitory computer readable media of claim 46, wherein a set of wearable computer glasses comprises the control circuit.

48. The one or more non-transitory computer readable media of claim 46, wherein the instructions, when executed by the control circuit, cause the control circuit to receive the unique identifier of the lighting control device via visible light communication (VLC).

49. The one or more non-transitory computer readable media of claim 48, wherein the instructions, when executed by the control circuit, cause the control circuit to receive the unique identifier at a frequency that is imperceivable to the human eye.

50. The one or more non-transitory computer readable media of claim 46, wherein the floor plan identifier is an alphanumeric string entered by the user.

51. The one or more non-transitory computer readable media of claim 46, wherein the floor plan identifier is received based on a selection of the user.

52. The one or more non-transitory computer readable media of claim 46, wherein the instructions, when executed by the control circuit, cause the control circuit to receive the unique identifier of the lighting control device via radio frequency (RF) signals.

53. The one or more non-transitory computer readable media of claim 46, wherein the instructions, when executed by the control circuit, cause the control circuit to transmit a digital message comprising control instructions configured to control the lighting control device via the communication circuit, wherein the digital message comprises one or more of the unique identifier of the lighting control device or the floor plan identifier.

54. The one or more non-transitory computer readable media of claim 46, wherein the other device comprises a system controller.

* * * * *